(12) United States Patent
Eberle et al.

(10) Patent No.: US 7,490,189 B2
(45) Date of Patent: Feb. 10, 2009

(54) MULTI-CHIP SWITCH BASED ON PROXIMITY COMMUNICATION

(75) Inventors: Hans Eberle, Sunnyvale, CA (US); Nils Gura, Mountain View, CA (US); Wladyslaw Olesinski, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 307 days.

(21) Appl. No.: 11/454,166

(22) Filed: Jun. 14, 2006

(65) Prior Publication Data

US 2007/0291535 A1 Dec. 20, 2007

(51) Int. Cl.
*H05K 7/00* (2006.01)
*G06F 13/00* (2006.01)

(52) U.S. Cl. .................. 710/317; 361/734; 361/735
(58) Field of Classification Search ........... 710/317, 710/305; 361/734, 735
See application file for complete search history.

(56) References Cited

U.S. PATENT DOCUMENTS

| | | | | | |
|---|---|---|---|---|---|
| 3,619,504 | A | * | 11/1971 | De Veer et al. ............... | 375/257 |
| 3,997,229 | A | * | 12/1976 | Narozny et al. ............. | 439/492 |
| 4,489,364 | A | * | 12/1984 | Chance et al. .............. | 361/737 |
| 4,807,183 | A | * | 2/1989 | Kung et al. ................. | 710/317 |
| 4,885,126 | A | * | 12/1989 | Polonio ....................... | 361/757 |
| 5,157,654 | A | * | 10/1992 | Cisneros ...................... | 370/414 |
| 5,261,059 | A | * | 11/1993 | Hedberg et al. ............. | 710/317 |
| 5,306,874 | A | * | 4/1994 | Biron .......................... | 174/262 |
| 5,399,898 | A | * | 3/1995 | Rostoker ..................... | 257/499 |
| 5,444,705 | A | * | 8/1995 | Olnowich et al. ........... | 370/388 |
| 5,787,366 | A | * | 7/1998 | Adams .......................... | 701/1 |
| 5,940,389 | A | * | 8/1999 | Yang et al. .................. | 370/380 |
| 5,958,030 | A | * | 9/1999 | Kwa ........................... | 710/300 |
| 6,111,756 | A | * | 8/2000 | Moresco ...................... | 361/735 |
| 6,496,889 | B1 | * | 12/2002 | Perino et al. ................ | 710/110 |
| 6,625,682 | B1 | * | 9/2003 | Simon et al. ................ | 710/305 |
| 6,636,932 | B1 | * | 10/2003 | Regev et al. ................ | 710/317 |
| 6,697,420 | B1 | * | 2/2004 | Simon et al. ................ | 375/220 |
| 6,735,197 | B1 | * | 5/2004 | Duschatko et al. .......... | 370/386 |
| 6,760,870 | B1 | * | 7/2004 | Snyder et al. ............... | 714/712 |

\* cited by examiner

*Primary Examiner*—Paul R Myers
(74) *Attorney, Agent, or Firm*—Park, Vaughan & Fleming LLP

(57) ABSTRACT

A switch contains a first semiconductor die, which is configured to receive signals on a plurality of input ports and to output the signals on a plurality of output ports. The first semiconductor die is further configured to selectively couple the signals between the input and output ports using a plurality of switching elements in accordance with a set of control signals, which correspond to a configuration of the switch. During this process, a plurality of proximity connectors, proximate to a surface of the semiconductor die, are configured to communicate the signals by capacitive coupling.

21 Claims, 19 Drawing Sheets

── 1700

```
┌─────────────────────────────────────┐
│     Selectively Couple Signals From │
│  One or More Input Ports to One or More │
│        Output Ports of a Switch     │
│               1710                  │
│                                     │
│   ┌─────────────────────────────┐   │
│   │   Communicate the Signals   │   │
│   │ Between Semiconductor Dies in│  │
│   │  the Switch Using Proximity │   │
│   │     Connectors That Are     │   │
│   │     Capacitively Coupled    │   │
│   │            1712             │   │
│   └─────────────────────────────┘   │
└─────────────────────────────────────┘
```

FIG. 17

MULTI-CHIP SWITCH BASED ON PROXIMITY COMMUNICATION

BACKGROUND

1. Field of the Invention

The present invention relates to techniques for communicating signals through switches. More specifically, the present invention relates to the design of a multi-chip switch comprised of semiconductor dies that communicate with each other using capacitively coupled proximity pads or connectors.

2. Related Art

Many computer systems and networks include switches to selectively communicate data items between different system components. These switches often include multiple input ports and multiple output ports, which are often implemented as high-speed serial input/output (I/O) ports. In contrast with lower-speed parallel ports, these high-speed serial ports offer advantages, such as a reduction in overall power consumption and in associated port area (in terms of the number of printed circuit boards, integrated circuit or chip packages, and/or I/O connectors). However, high-speed serial ports typically require additional circuits to serialize and deserialize data, to encode and decode data, and to recover an embedded clock. These additional circuits typically consume a significant amount of the area on an integrated circuit. These circuits, therefore, may partly determine the size and complexity of a chip.

Furthermore, many existing switches are based on the memory switch architecture illustrated in FIG. 1. A memory switch 110 includes a shared multiple-port memory that includes one or more logical buffer memories 114 that selectively couple input ports 112 to output ports 118 in accordance with a configuration provided by control logic 116. The shared memory switch 110 provides sufficient memory bandwidth that the input ports 112 can simultaneously write data into the buffer memories 114, thereby avoiding data collisions. Buffer memory 114 is typically high-bandwidth memory that is often implemented on-chip. The amount of buffer memory, therefore, may also determine the size of a switch.

If the scale of the switch does not allow for a single-chip implementation, the switch may have to be partitioned among several chips with each chip providing a fraction of the aggregate switching capacity. Such multiple-chip implementations are often based on architectures that include multiple switching stages or multiple switching planes.

Unfortunately, it is often challenging to provide interconnects in a multi-chip switch with an aggregate bandwidth that is sufficient to accommodate the total bandwidth of the signals received by the switch. As a consequence, interconnects in large-scale switches may be complicated and expensive. For example, existing switches that offer multiple Tb/s capability typically include multiple racks with cabling between the racks to provide interconnects that can accommodate the full bandwidth of the switch.

Therefore, multi-chip switches often have large footprints and consume significant amounts of power. Moreover, as the size of a given switch increases, it may be more difficult to control due to increased delays and latency. This, in turn, may lead to challenges associated with coordinating or scheduling the data flow in the switch. The complexity and expense associated with the components used to address these challenges can greatly impact the performance and reliability of multi-chip switches.

Hence, what is needed is a method and an apparatus that facilitates switching without the problems listed above.

SUMMARY

One embodiment of the present invention provides a switch that contains a first semiconductor die that is configured to receive signals on a plurality of input ports and to output the signals on a plurality of output ports. The first semiconductor die is further configured to selectively couple the signals between the input and output ports using a plurality of switching elements in accordance with a set of control signals, which correspond to a configuration of the switch. During this process, a plurality of proximity connectors, proximate to a surface of the semiconductor die, are configured to communicate the signals through capacitive coupling.

In some embodiments the switch further includes control logic coupled to the plurality of switching elements, which is configured to provide the set of control signals.

In some embodiments, the switch further includes one or more additional semiconductor dies coupled to the first semiconductor die. The first semiconductor die and the one or more additional semiconductor dies are configured to communicate to one another by capacitive coupling using one or more of the plurality of proximity connectors. This communication may occur synchronously and/or asynchronously via a bridge chip that couples the first semiconductor die and at least one of the one or more additional semiconductor dies. In some embodiments, the switch further includes a circuit to resynchronize phases of signals on at least two signal lines on the bridge chip.

The first semiconductor die and the one or more additional semiconductor dies may be arranged in a variety of configurations, including a linear array, a 2-dimensional array, or a ring topology. These configurations may implement different switch architectures, such as a buffered crossbar, a fat-tree network, a Clos network, a Benes network, a Banyan switch, an Omega switch, and/or a load-balanced switch. Furthermore, in some embodiments the first semiconductor die and at least one of the one or more additional semiconductor dies have a common architecture.

In some embodiments, the communication bandwidth between the first semiconductor die and one of the one or more additional semiconductor dies approximately equals or exceeds a total or full bandwidth associated with the signals received by the switch.

In some embodiments, the switch further includes an optical transceiver coupled to the first semiconductor die.

In some embodiments, the signals are encoded with a channel code that is DC-balanced.

In some embodiments, the switch further includes a demultiplexer coupled between the plurality of input ports and the plurality of switching elements, wherein the demultiplexer is configured to provide data units having a fixed size and/or a variable size to the plurality of switching elements in accordance with the configuration of the switch. And in some embodiments, the switch further includes a multiplexer coupled between the plurality of switching elements and the plurality of output ports, wherein the multiplexer is configured to receive the data units from the plurality of switching elements. Note that the data units may be received at the multiplexer in a same and/or a different order than that provided by the demultiplexer. Furthermore, in some embodiments the multiplexer and/or the demultiplexer may include memory.

In some embodiments, the switch may be included in a computer system.

Another embodiment of the present invention provides a method for switching signals, wherein signals are selectively coupled from one or more input ports to one or more output ports of a switch in accordance with a switching configuration of the switch. As the signals are coupled, the signals are communicated between semiconductor dies in the switch using proximity connectors that are capacitively coupled.

BRIEF DESCRIPTION OF THE FIGURES

FIG. 17 is a flow chart illustrating an embodiment of a process for switching signals.

Note that like reference numerals refer to corresponding parts throughout the drawings.

DETAILED DESCRIPTION

Figure 1:
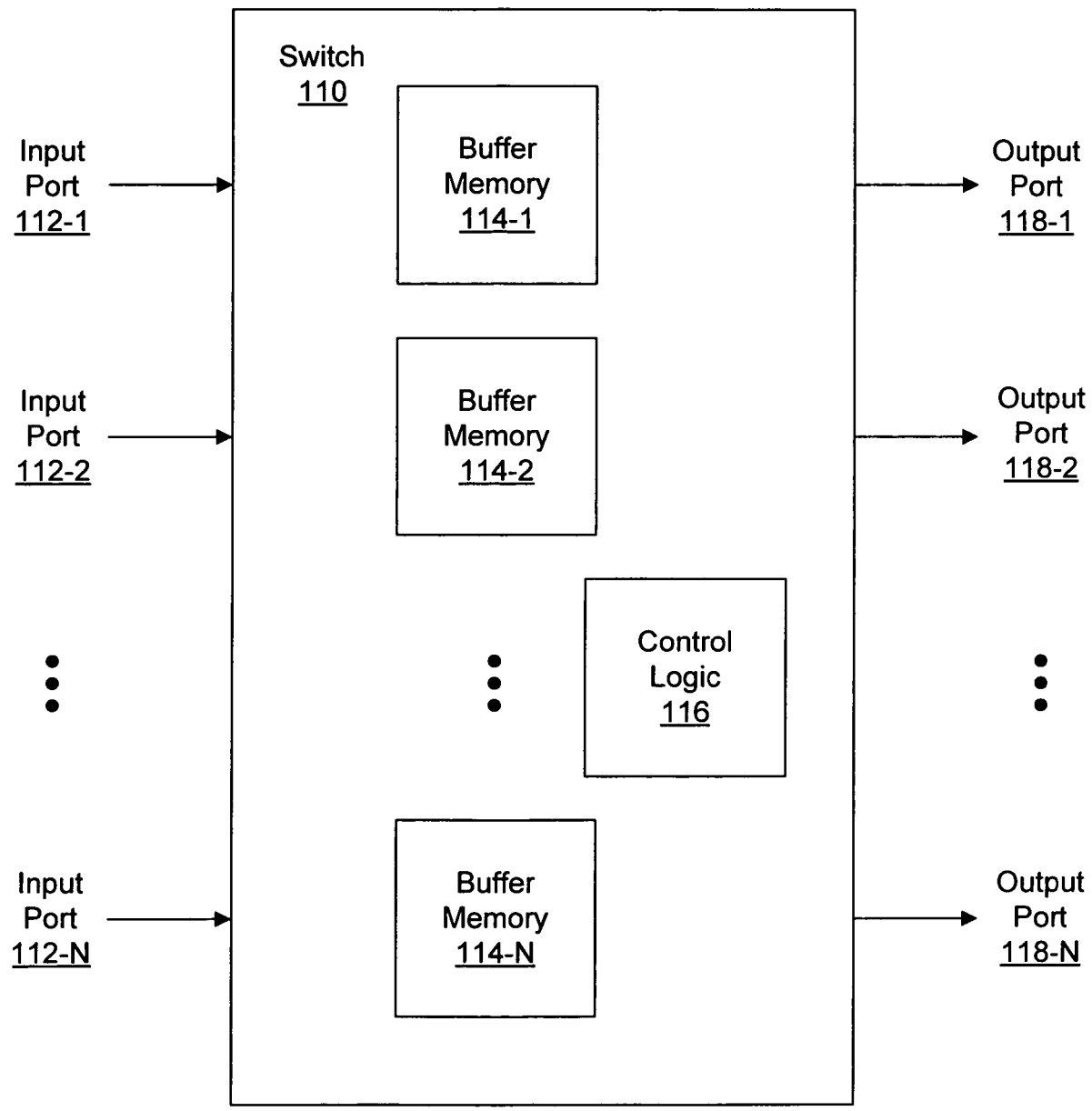
FIG. 1 is a block diagram illustrating an embodiment of a memory switch architecture.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a method, a switch, and systems that include the switch are described. A semiconductor die in the switch communicates with other semiconductor dies and/or devices in the switch using proximity communication. In proximity communication, a first component (such as a semiconductor die or chip) is situated face-to-face with another component such that proximity pads or connectors on the first component are capacitively coupled with proximity pads or connectors on the other component. These capacitively coupled proximity pads allow communication of signals between the components without having to route the signals through intervening signal lines within a printed circuit board. When used in the switch, proximity communication may enable interconnects between switching elements and components in the switch that have sufficient bandwidth to accommodate the total or full bandwidth associated with signals received by the switch. This may reduce the cost, complexity and power consumption of the switch, especially in multi-chip switch architectures. In addition, the use of proximity communication may increase integration (i.e., reduce switch size), increase reliability, and improve performance of the switch.

The switch may be used in a variety of applications, including data centers, networks, and/or computer systems (such as multi-processor computer systems). For example, the switch may be included in a backplane that is coupled to multiple processor blades, or the switch may couple different types of components (such as processors, memory, I/O devices, and/or peripheral devices). The switch may also perform the functions of a hub, a bridge, and/or a router. As a consequence, in some embodiments the switch is referred to as an "intelligent hub" or a "switching hub." Furthermore, the switch may operate at one or more layers in the Open Systems Interconnection Reference Model, such as the physical layer (layer 1), the data link layer (layer 2), and/or the network layer (layer 3) Thus, in some embodiments the switch may include a multi-layer switch.

The switch may support a variety of communication protocols, including Ethernet, IEEE 802.11 (Wi-Fi), Token Ring, Fiber Distributed Data Interface (FDDI), Point-to-Point Protocol (PPP), High-Level Data Link Control (HDLC), International Telecommunication Standardization Sector Q.921, Frame Relay, Asynchronous Transfer Mode (ATM), Fibre Channel, Infiniband, PCI Express, International Telecommunication Standardization Sector Q.931, NetBIOS Extended User Interface (NetBEUI), Transmission Control Protocol (TCP), and/or Internet Protocol (IP). Therefore, the switch may support frame or packet switching, where the data units communicated through the switch have a variable size, and/or switching protocols in which the data units have a fixed size (note that such data units are sometimes referred to as cells). Furthermore, in some embodiments the switch may support point-to-point and/or point-to-multipoint operation, as well as half-duplex and/or full-duplex operation. Note that one or more of these protocols may be implemented in the switch in hardware and/or software. Also note that signals selectively coupled by the embodiments of the switch may include analog signals, data packets, and/or data streams, which may be binary symbols or encoded symbols (for example, using multiple-pulse amplitude modulation).

Figure 2:
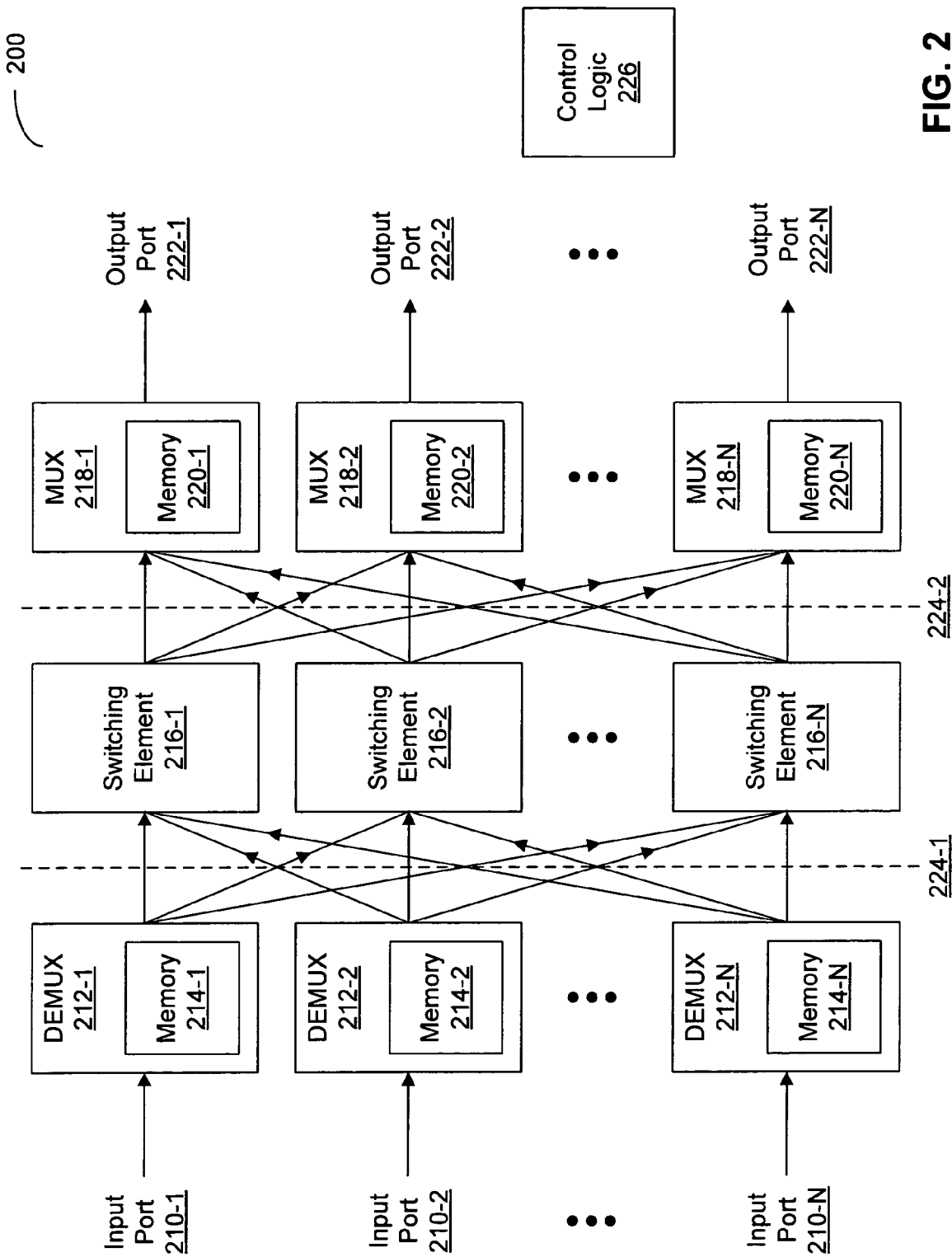
FIG. 2 is a block diagram illustrating an embodiment of a multi-chip switch.

We now describe embodiments of a switch for switching signals. FIG. 2 presents a block diagram illustrating an embodiment of a multi-chip switch 200. An input stage includes multiple demultiplexers (DEMUXs) 212 or routers that distribute signals (data traffic) received at input ports 210 to a switching stage, which includes multiple switching elements 216. Data units in the signals may be sent to one or more of the switching elements 216 in accordance with addresses, such as a Media Access Control (MAC) address (for example, IEEE EUI-48).

In some embodiments, the data units are sliced by the demultiplexers (DEMUXs) 212 and data subunits are sent to one or more of the switching elements 216. For example, a several kilo-byte input data stream may be split into multiple 64 byte (B) cells. In other embodiments, however, slicing of the data units may occur in circuits that are external to the multi-chip switch 200, such as in a circuit board (which is sometimes referred to as a line card) that may be used with the switch.

Switching elements 216 selectively couple the signals to an output stage that includes multiple multiplexers (MUXs) 218, which collect traffic from the switch stage and forward it to output ports 222. This selective coupling may be in accordance with control signals from control logic 226 that select or specify a configuration of the multi-chip switch 200. Note that the control logic 226 may be internal or external to the multi-chip switch 200. Furthermore, the control logic 226 may be central or distributed. For example, the control logic 226 may be distributed among the line cards, or the control logic 226 may be included in one or more of the switching elements 216.

Demultiplexers (DEMUXs) 212 may include memory 214, and multiplexers (MUXs) 218 may include memory 220. This memory, which may be dynamic and/or static, may be used to temporarily store data to avoid data collisions during communication through the multi-chip switch 200. For example, the multi-chip switch 200 may implement a forwarding process, such as Store and Forward, Cut-Through Switching, Fragment-Free Cut-Through Switching (a copyright of Intel Corporation), and/or Adaptive Switching (a copyright of Intel Corporation).

In some embodiments, the multiple multiplexers (MUXs) 218 may use memory 220 to reassemble data subunits. And in some embodiments, the multiple multiplexers (MUXs) 218 may use memory 220 to synchronize and/or re-sequence data that is received from switching elements 216. For example, data may be received in a different order than the order in which the data was provided by one or more of the demultiplexers (DEMUXs) 212. In other embodiments, however, reassembly of data subunits and/or re-sequencing occurs in circuits that are external to the multi-chip switch 200, such as in a line card.

Note that if a full or total bandwidth of the signals received on the input ports 210 is b, a bandwidth of an internal link (such as between demultiplexer (DEMUX) 212-1 and switching element 216-1) in the multi-chip switch 200 is b/N in order for data flow in the switch 200 to keep pace with data received at the input ports 210. An aggregate bandwidth at bisecting planes 224, however, is b (this bandwidth is sometimes referred to as a bisection bandwidth). As discussed previously, it may be difficult to achieve these bandwidths using existing interconnects. However, interconnects that include proximity communication may have significantly larger bandwidths. For example, by using interconnects that include proximity communication each switching element and/or each semiconductor die or chip in a given switch may have the same bandwidth as the switch as a whole (i.e., the bisection bandwidth). This may allow multi-chip switches that are cheaper, less complex and that have improved performance. Embodiments of a multi-chip switch that includes proximity communication are described further below with reference to FIGS. 7-16.

The multi-chip switch 200 may include fewer components or additional components. For example, the switch 200 may include one or more additional switching stages (such as the fat-tree network described below in FIG. 4), or the control logic 226 may include a scheduler that manages data flow in the switch. Furthermore, two or more components may be combined into a single component, and the position of one or more components may be changed. In some embodiments, the multi-chip switch 200, as well as the other multi-chip switch embodiments described below, include one or more stages.

Figure 3:
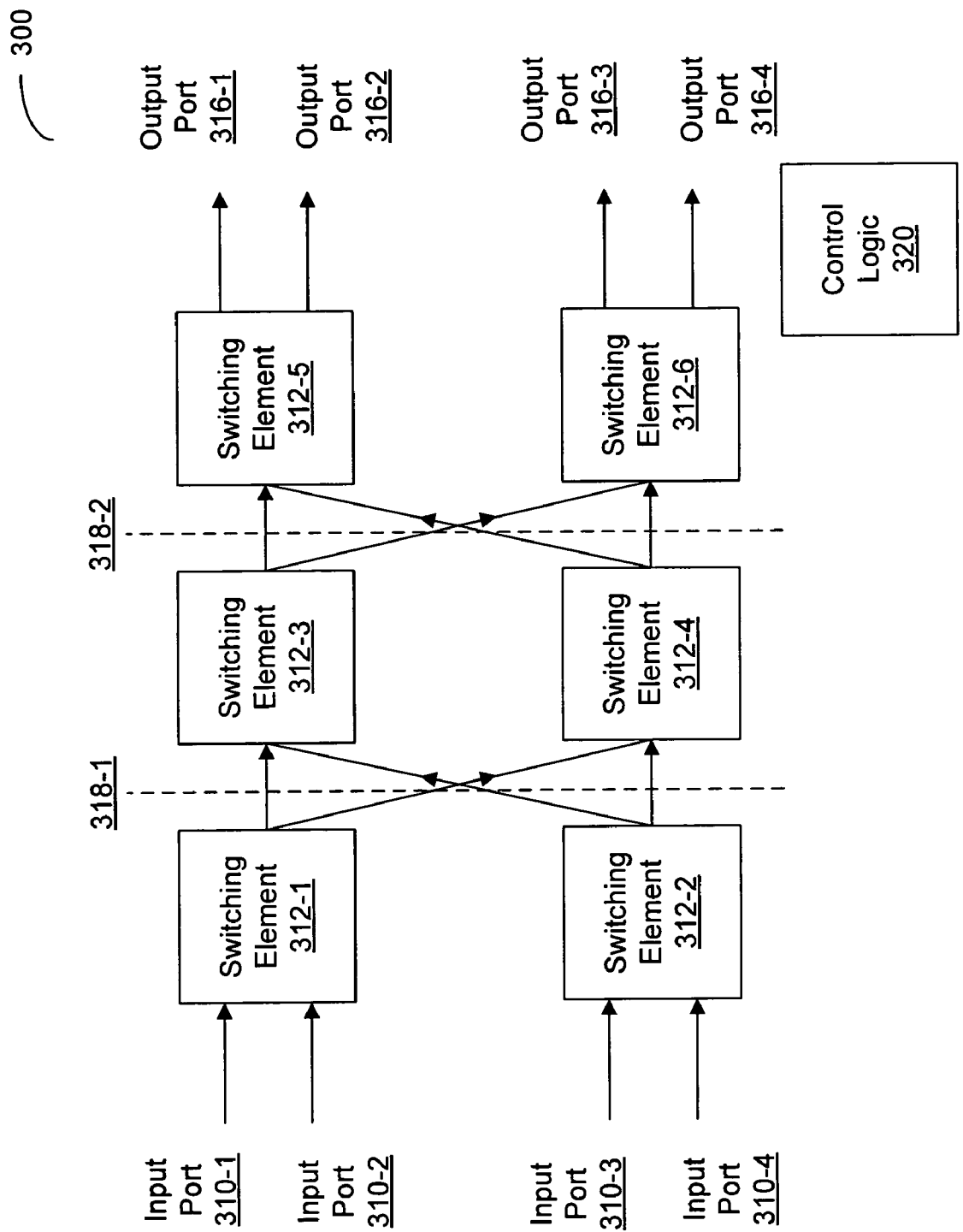
FIG. 3 is a block diagram illustrating an embodiment of a multi-chip switch.
Figure 4:
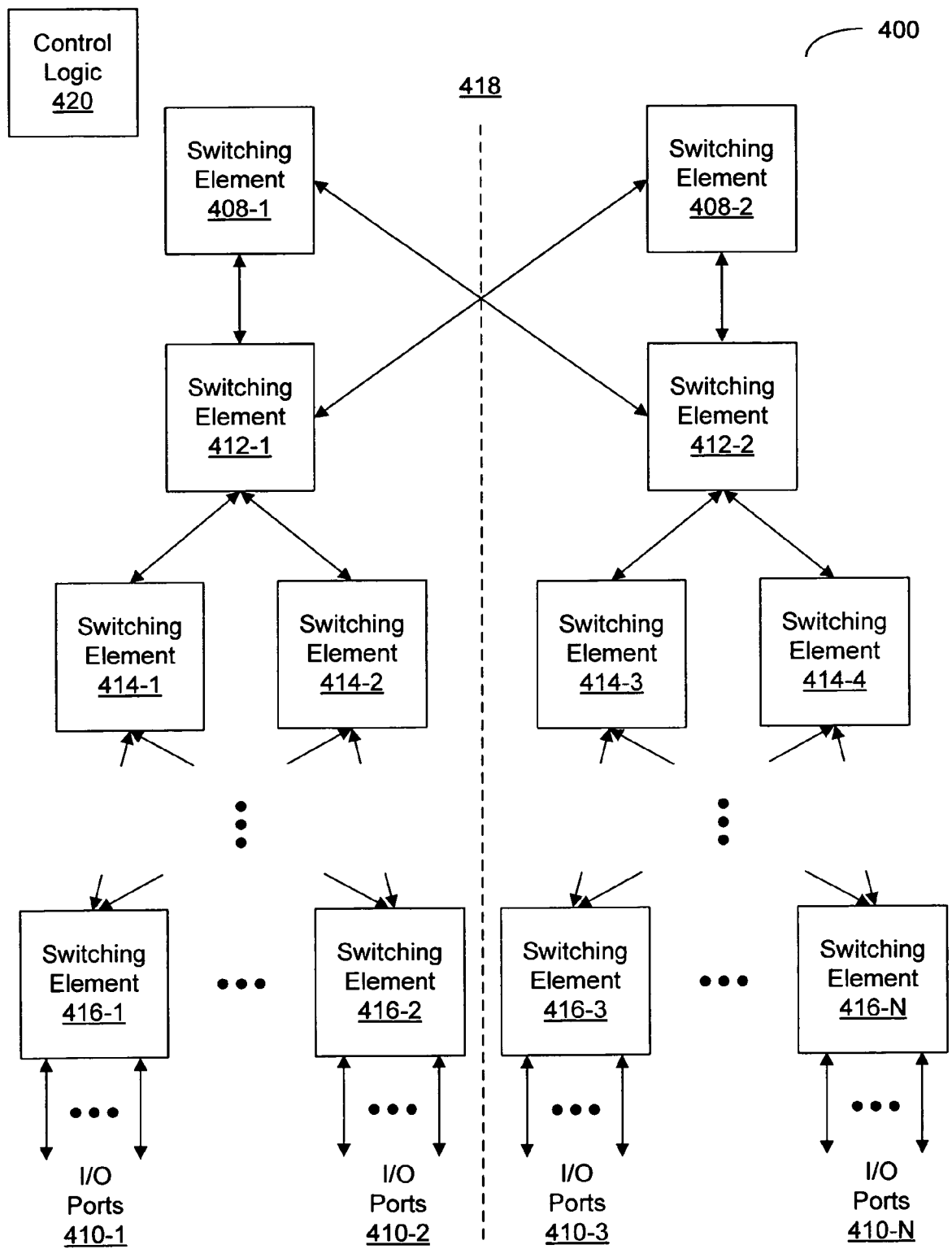
FIG. 4 is a block diagram illustrating an embodiment of a multi-chip switch.

Larger switches may be implemented by assembling smaller groups of switching elements, such as the switching elements 216, in a hierarchical fashion. This is illustrated in FIGS. 3 and 4. FIG. 3 presents a block diagram illustrating an embodiment of a multi-chip switch 300 in which six 2×2 switching elements 312 (each having an interconnect bandwidth of b/2) are arranged in 3 stages to selectively couple input ports 310 and output ports 316. This selective coupling is in accordance with control signals provided by control logic 320. Note that the multi-chip switch 300 has a bisection bandwidth at bisecting planes 318 of b. In addition, the topology of this switch is referred to as a Clos network, whose size scales logarithmically as additional instances of switching elements 312 and stages are added to accommodate additional input ports 310 and output ports 316.

The multi-chip switch 300 may include fewer components or additional components. Furthermore, two or more components may be combined into a single component, and the position of one or more components may be changed.

FIG. 4 presents a block diagram illustrating an embodiment of a multi-chip switch 400 in which switching elements 408, 412, 414 and 416, arranged in multiple stages, selectively couple I/O ports 410. Communication between switching elements 408, 412, 414 and 416 is on bidirectional links, and a bandwidth of the links increases at higher stages in the hierarchy of the multi-chip switch 400. For example, switching elements 416 each have a bandwidth of 2b/N, and switching elements 412 each have a bandwidth of b. (Note that a bisection bandwidth at bisecting plane 418 is b.) Furthermore, a configuration of the multi-chip switch 400 is in accordance with control signals provided by control logic 420. The topology of this switch is referred to as a fat-tree network.

Note that the multi-chip switch 400 may include fewer components or additional components. Furthermore, two or more components may be combined into a single component, and the position of one or more components may be changed.

Figure 5:
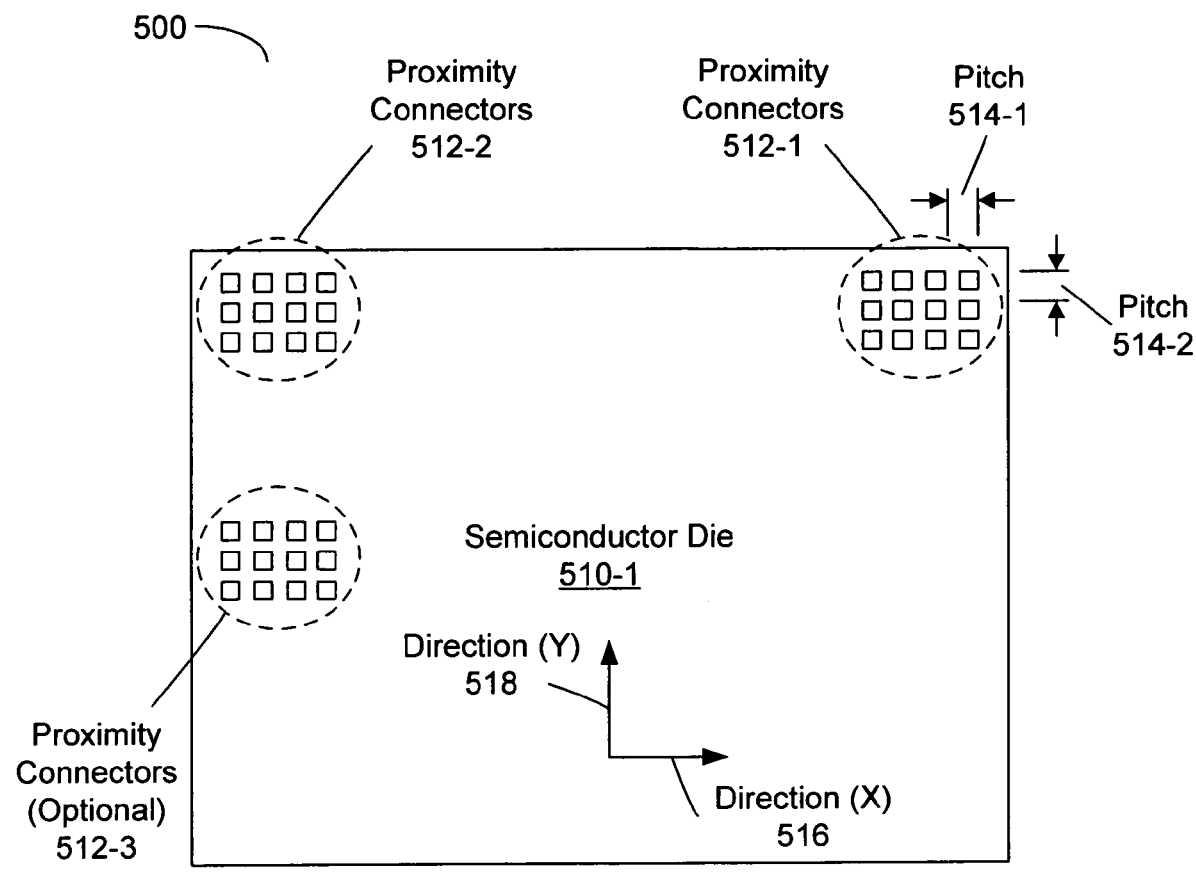
FIG. 5 is a block diagram illustrating an embodiment of a device that includes proximity connectors.

We now described embodiments of devices and systems that include proximity communication. FIG. 5 presents a block diagram illustrating an embodiment of a device 500 that includes proximity connectors or pads 512. Device 500 may include at least one semiconductor die 510, wherein semiconductor die 510 may include integrated circuit electronics corresponding to layers deposited on a semiconductor substrate. Note that semiconductor die 510 may be packaged in a single-chip module (SCM) and/or a multi-chip module (MCM), wherein the MCM may include two or more SCMs. When packaged, for example in the SCM or the MCM, the one semiconductor die 510 is sometimes referred to as a "chip."

In one embodiment, the proximity connectors 512 may be on or proximate to at least one surface of the semiconductor die 510, the SCM and/or the MCM. In other embodiments, the semiconductor die 510, the SCM and/or the MCM may be coupled to the proximity connectors 512. In an exemplary embodiment, the plurality of proximity connectors 512 are substantially located at or near one or more corners (proximity connectors 512-1 and 512-2) and/or edges (proximity connectors 512-3) of the semiconductor die 510. In other embodiments, proximity connectors 512 may be situated at one or more arbitrary locations on, or proximate to, the surface of the semiconductor die 510.

As illustrated for the proximity connectors 512-1, there is a first pitch 514-1 between adjacent connectors or pads in a first direction (X) 516 of the surface and a second pitch 514-2 between adjacent connectors or pads in a second direction (Y) 518 of the surface. In some embodiments, the first pitch 514-1 and the second pitch 514-2 are approximately equal.

Figure 6:
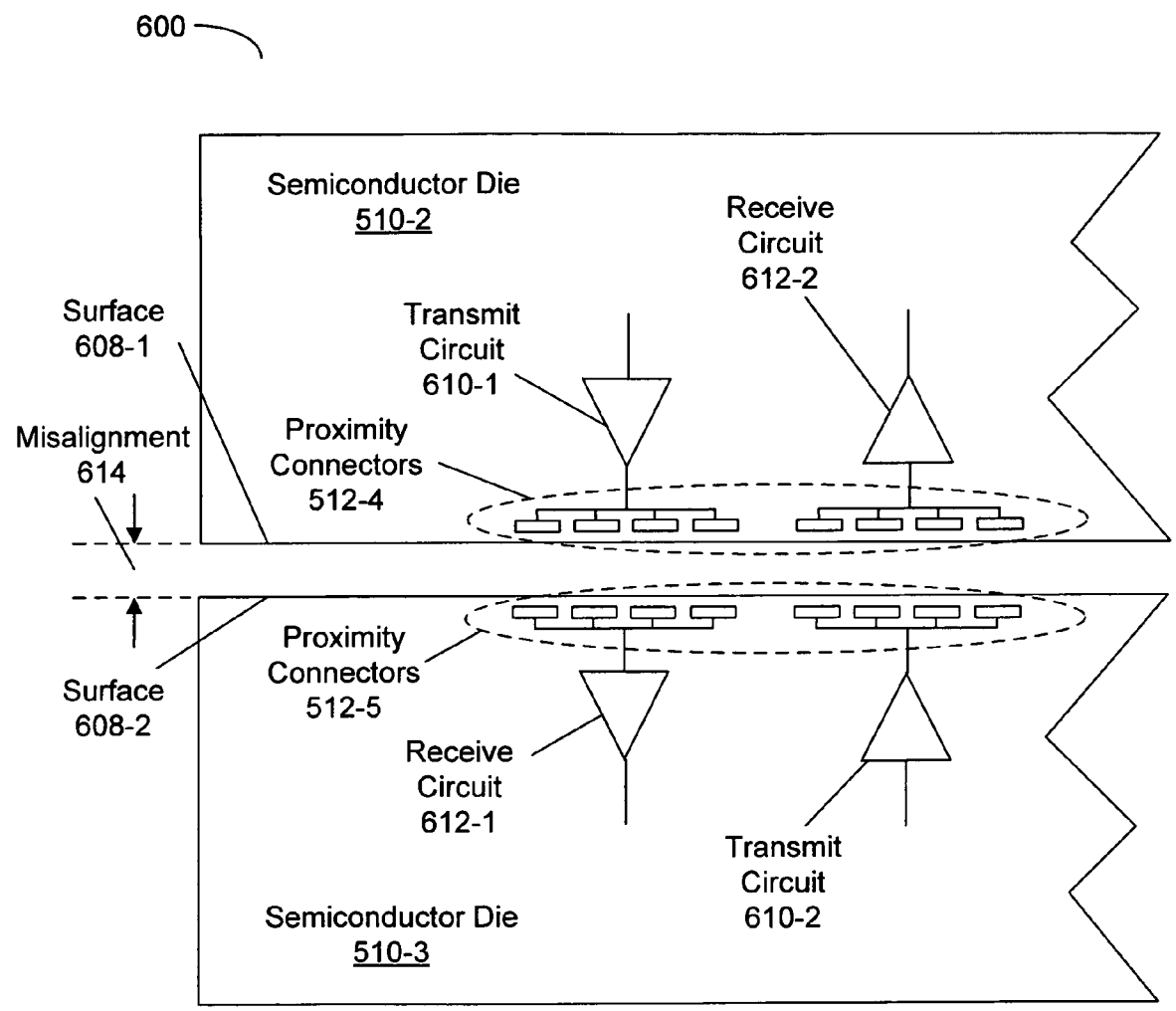
FIG. 6 is a block diagram illustrating an embodiment of a system that includes semiconductor dies that communicate using proximity communication.

FIG. 6 presents a block diagram illustrating an embodiment of a system 600 that includes semiconductor dies 510 that communicate using proximity communication. The devices 510 may include proximity connectors or pads 512 that are on or proximate to at least respective surfaces 608 of the semiconductor dies 510. For example, the plurality of proximity connectors 512 may be situated beneath protective layers such that they are located below the surfaces 608. Moreover, subsets of the proximity connectors 512 may be coupled to transmit circuits 610 (such as transmit drivers) and receive circuits 612 (such as receivers). One of the transmit circuits 610, at least a subset of the proximity connectors 512 on the adjacent semiconductor dies 510, and one of the receive circuits 612 may constitute a communication channel. For example, the communication channel may include transmit circuit 610-1, some of the proximity connectors 512, and receive circuit 612-1. Note that transmit circuits 610 and receive circuits 612 may utilize voltage-mode signaling (i.e., voltage-mode drivers and receivers). Furthermore, semiconductor dies 510 may also include wiring and electronics (not shown) to relay the data signals to additional electronics on the semiconductor dies 510, such as logic, memory (for example, a packet buffer memory), I/O ports, demultiplexers, multiplexers, and switching elements.

In order to communicate data signals using proximity communication, transmit and receive proximity connectors 512 on adjacent semiconductor dies 510 may have, at worst, only limited misalignment, i.e., substantially accurate alignment. For densely packed proximity connectors, i.e., proximity connectors 512 having a small spacing or pitch 514 (FIG. 5) between adjacent pads, the alignment between two or more proximity connectors 512 on adjacent semiconductor dies 510 may be within a few microns in the first direction (X) 516 (FIG. 5) and/or a few microns in the second direction (Y) 518 (FIG. 5) in a first plane including at least some of the proximity connectors 512, and/or within a few microns in a third direction (Z) approximately perpendicular to the first plane. The system 600 illustrates a misalignment 614 in the third direction (Z).

In some embodiments, the proximity connectors 512 may be aligned in six degrees of freedom, including the first direction (X) 516 (FIG. 5), the second direction (Y) 518 (FIG. 5), the third direction (Z), an angle in the first plane defined by the first direction (X) 516 (FIG. 5) and the second direction (Y) 518 (FIG. 5), an angle in a second plane defined by the first direction (X) 516 (FIG. 5) and the third direction (Z), and an angle in a third plane defined by the second direction (Y) 518 (FIG. 5) and the third direction (Z). Note that if a surface, such as the surface 608-1, of either of the adjacent semiconductor dies 510 is non-planar (for example, due to quadrapole distortion), additional alignment problems may be introduced.

In some embodiments, allowed misalignment in the first direction (X) 516 (FIG. 5), the second direction (Y) 518 (FIG. 5) and/or the third direction (Z) is less than one half of the pitch 514 (FIG. 5) between adjacent pads 512. For example, misalignment in the first direction (X) 516 (FIG. 5) and/or the second direction (Y) 518 (FIG. 5) may be less than 25 μm, and the misalignment 614 in the third direction (Z) may be less than 5 μm.

Solutions, such as self-alignment and/or self-adjustment of relative positions of the proximity connectors 512 on adjacent semiconductor dies 510 and/or in a component coupling two or more semiconductor dies 510, may reduce and/or eliminate the misalignment 614 in the third direction (Z). For example, structures that have flexibility compliance or are spring like may be used. In other embodiments, a feedback control loop may be used to reduce and/or eliminate the misalignment 614 in the third direction (Z).

Reducing or eliminating the misalignment 614, in turn, may lead to at least partial overlap of one or more proximity connectors 512 on the adjacent semiconductor dies 510 and increase a magnitude of the capacitively coupled data signals. In addition, the solutions may reduce misalignment in the first plane, i.e., the plane including at least some of the proximity connectors 512, when used in conjunction with techniques such as electronic steering (where data signals are routed to respective proximity connectors 512 in accordance with the alignment in the first plane). As a consequence, these solutions may facilitate proximity communication between the semiconductor dies 510, SCMs and/or MCMs. The solutions may also reduce and/or eliminate a need for narrow tolerances, precise manufacturing, and/or precise assembly of the semiconductor dies 510, the SCM and/or the MCM.

In the embodiments described above and below, the proximity connectors 512 on the adjacent semiconductor dies 510 utilize capacitive coupling and/or a number of data signal channels for inter-chip communication. In other embodiments, additional connectors may be overlapped on adjacent semiconductor dies 510.

While the description below uses capacitively coupled proximity connectors as an illustration, one embodiment of the present invention uses magnetic proximity connectors, where data signals are communicated magnetically between terminals on closely adjacent semiconductor dies 510. Another embodiment uses optical proximity connectors, where data signals are communicated optically between terminals on adjacent semiconductor dies 510. Yet another embodiment couples connectors in adjacent semiconductor dies 510 using an array of solder balls.

While the device 500 (FIG. 5) and the system 600 are illustrated as having a number of components in a given configuration, in other embodiments the device 500 (FIG. 5) and/or the system 600 may include fewer components or additional components, two or more components may be combined into a single component, and/or a position of one or more components may be changed.

As discussed previously, interconnects that include proximity communication may have significantly increased bandwidth. In particular, proximity communication offers I/O densities of several Tb/s/mm$^2$ or more, which corresponds to data rates of tens of Tb/s for a reasonable sized array of proximity connectors. This is larger than the bandwidths of most if not all existing multi-chip switches. In contrast with chips or switching elements in existing multi-chip switches (where the bandwidth of each chip or switching element is a fraction of the bisection bandwidth of the switch), components that include proximity communication may have bandwidths that are approximately equal to or larger than the bisection bandwidth of the switch. Therefore, multi-chip switches that include this technology may allow different partitioning of components in the switch, different switch architectures, and/or may allow expensive off-chip wiring (which is currently implemented using board traces, connectors and cables) to be replaced and/or eliminated.

Figure 7A:
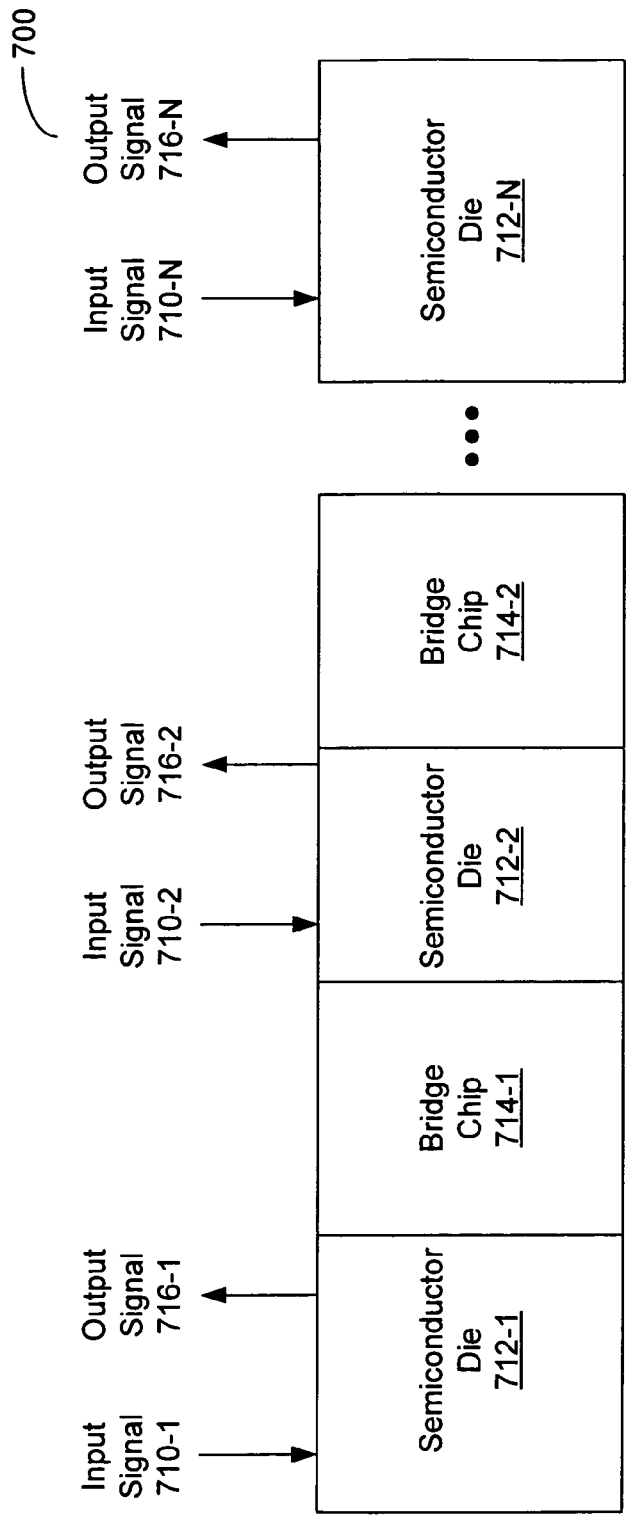
FIG. 7A is a block diagram illustrating a top-view of an embodiment of a multi-chip switch.
Figure 7B:
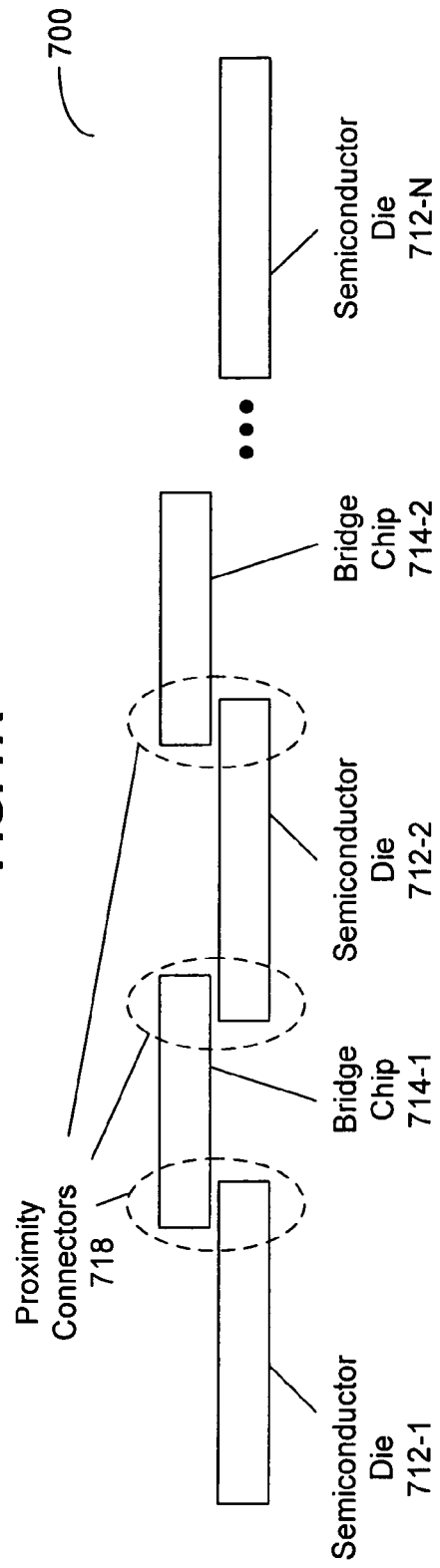
FIG. 7B is a block diagram illustrating a side-view of an embodiment of a multi-chip switch.

We now describe embodiments of a switch that includes components that communicate using proximity communication. FIG. 7A presents a block diagram illustrating a top-view of an embodiment of such a multi-chip switch 700, and FIG. 7B presents a block diagram illustrating a side-view of the multi-chip switch 700. Multi-chip switch 700 includes multiple semiconductor dies 712 and multiple bridge chips 714, which couple signals between adjacent semiconductor dies 712 using capacitively coupled proximity connectors 718. Note that the components in the multi-chip switch 700 are arranged in a linear array topology (which is also referred to as a vector topology or configuration).

Each of the semiconductor dies 712 may implement some or all of the functionality of a switch, such as the switch 200 (FIG. 2), and are sometimes referred to as switch chips or logic chips. Thus, the semiconductor dies 712 may include I/O ports to communicate input signals 710 and output signals 716, as well as multiple switching elements. Furthermore, in some embodiments at least one of the semiconductor dies 712 includes control logic that provides control signals that configure the switching elements.

Bridge chips 714 may include multiple signal lines that couple signals from receive proximity connectors on one end of the bridge chips 714 to transmit proximity connectors on the other end. Such communication across the bridge chips 714 may be synchronous and/or asynchronous. As a consequence, in some embodiments bridge chips 714 include active electronics to transmit and receive signals, to amplify signals, and/or to resynchronize phases of signals on at least two of the signal lines (which is discussed further below with reference to FIG. 8B). In these embodiments, the bridge chips 714 may be implemented using semiconductor dies, however, these dies may include different circuits and functionality than the semiconductor dies 712. In other embodiments, however, the bridge chips 714 may be manufactured from a material other than a semiconductor.

In some embodiments, signals communicated in the multi-chip switch 700 are encoded (either internally or externally to the switch 700) using a channel code. In an exemplary embodiment, the channel code is a DC-balanced or DC-free code. For example, the channel code may be a (n, k) code, such as an 8/10 code. In some embodiments, header information is not encoded. Instead, such information may be inverted and repeated to achieve DC-balance. Furthermore, in some embodiments encoding and decoding of signals is not implemented in the switching elements. In these embodiments, encoding and decoding may occur external to the switch. In other embodiments, the channel code may be a rate 1 code, where a constraint such as DC-balance may be implemented by intentionally reversing data bits in a data sequence, for example, based on a running digital sum. These reversed bits are errors that may be corrected using an error correction code, such as a Reed Solomon code.

In an exemplary embodiment, input signals 710-1 communicate data, such as a set of data packets, to semiconductor die 712-1. Circuits in the semiconductor die 712-1 determine an appropriate routing or path for these data packets. Control logic in the multi-chip switch 700, which may be included in the semiconductor die 712-1, selects an appropriate switch configuration to route these data packets. For example, switching elements between row and column signal lines in the semiconductor die 712-1 may couple some of these data packets to an output port, where they are communicated to other components or segments in a larger system as output signals 716-1.

Some of the data packets may be communicated to another semiconductor die, such as semiconductor die 712-2. A transmit circuit in the semiconductor die 712-1 may output voltage-mode signals that correspond to data packets to one or more proximity connectors located on a surface of the semiconductor die 712-1. These voltage-mode signals are capacitively coupled to one or more additional proximity connectors on a surface of bridge chip 714-1. The voltage-mode signals may be received by a receive circuit in the bridge chip 714-1.

The received signals may be transported on one or more signals lines in the bridge chip 714-1. During this process, the received signals may be amplified and, optionally, synchronized for accumulated phase errors or differences (which is described further below with reference to FIG. 8B). At the other end of the bridge chip 714-1, another transmit circuit may output additional voltage-mode signals that correspond to the data packets to one or more proximity connectors located on a surface of that side of the bridge chip 714-1.

This internal (inter-chip) communication process continues until the data packets reach their destination or target semiconductor die(s) 712. There, switching elements are configured to route the data packets to an output port, where they are communicated to other components or segments in the system as output signals 716.

Although the multi-chip switch 700 is illustrated as having a number of discrete items, FIGS. 7A-7B and the other embodiments of the multi-chip switch described below in FIGS. 8A and 9-16 are intended to be a functional description of the various features which may be present in a multi-chip switch rather than as a structural schematic of the embodiments described herein. In practice, and as recognized by those of ordinary skill in the art, the functions of the multi-chip switch 700 (as well as the other embodiments) may be distributed over a large number of components performing particular subsets of functions. Therefore, the multi-chip switch 700 (as well as the other embodiments) may include fewer components or additional components, two or more components may be combined into a single component, and/or a position of one or more components may be changed. For example, in some embodiments bridge chips 714 may be face up or face down, and in other embodiments the bridge chips 714 may be replaced by additional semiconductor dies 712. In other embodiments, a 2-dimensional array of semiconductor dies 712 may be used. Furthermore, in some embodiments functions of the multi-chip switch 700 (as well as the other embodiments) may be implemented in hardware and/or in software.

Figure 8A:
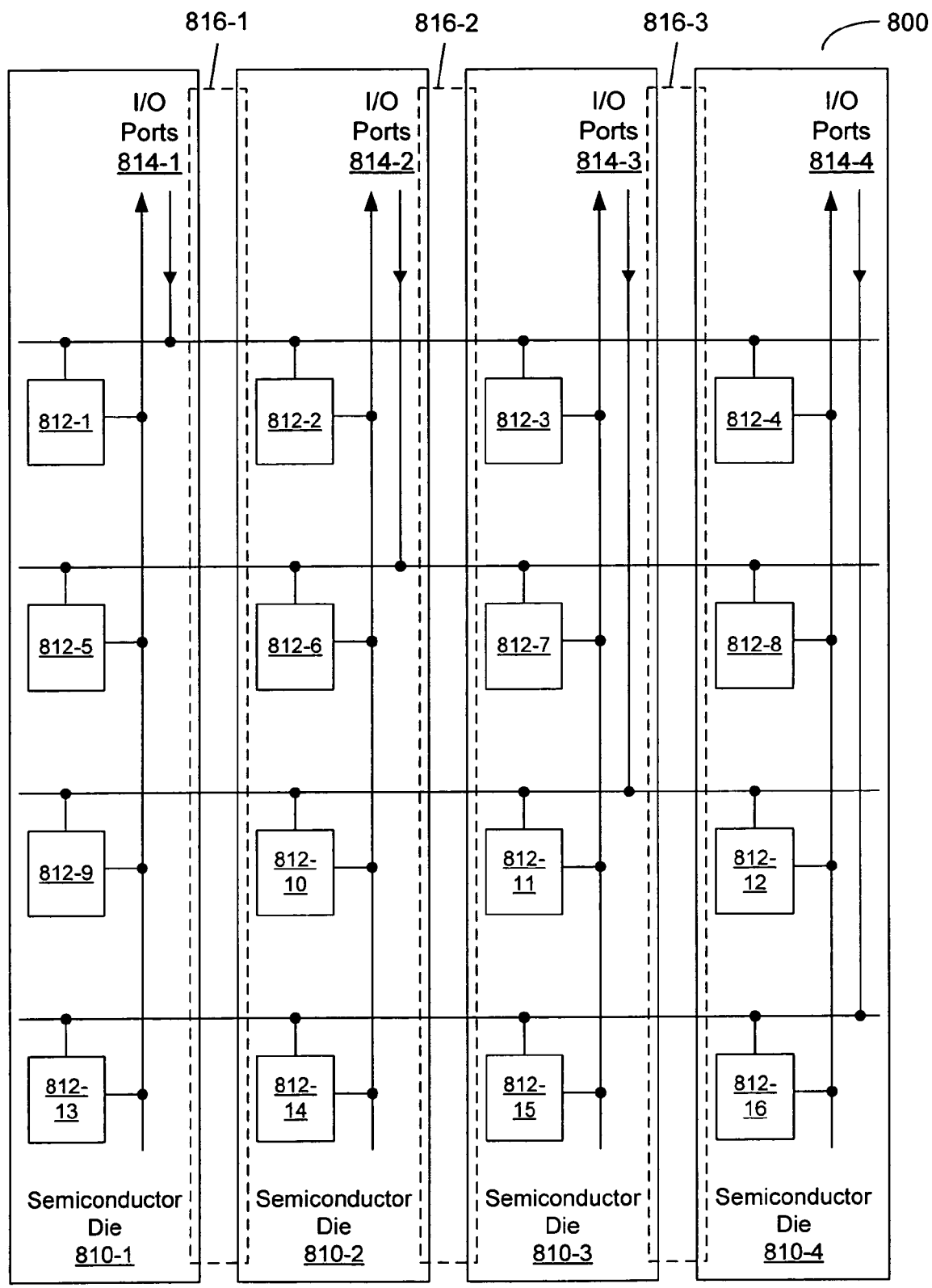
FIG. 8A is a block diagram illustrating an embodiment of a multi-chip switch.

FIG. 8A presents a block diagram illustrating an embodiment of a multi-chip switch 800, which is sometimes referred to as a buffered crosspoint switch. Multiple semiconductor dies 810 are coupled via bridge chips 816 using proximity communication. Note that the bandwidth of these interconnects (the bisection bandwidth) at least equals the total or full bandwidth of all of the I/O ports 814. Thus, the semiconductor dies 810 implement a 'flat-tree' architecture.

Each of the semiconductor dies 810 is a switching block, and includes I/O ports 814 and multiple buffer memories 812 that selectively couple row and column signal lines in a 2-dimensional array. (Such semiconductor dies 810 are also referred to as slices.) However, note that the architecture of the semiconductor dies 810 is not the same. In particular, input signal lines from the I/O ports 814 are coupled to different rows in the array in each of the semiconductor dies 810. In other embodiments, input signal lines may be coupled to more than one row in a given semiconductor die, and/or the signal lines may correspond to groups of signal lines, such as a data bus.

In an exemplary embodiment, I/O ports 814 utilize low voltage differential signaling and the multi-chip switch 800 implements an IEEE 802.3ae 10GbE protocol, which is also referred to as XAUI. While not shown in FIG. 8A, the multi-chip switch 800 may include control logic.

Figure 8B:
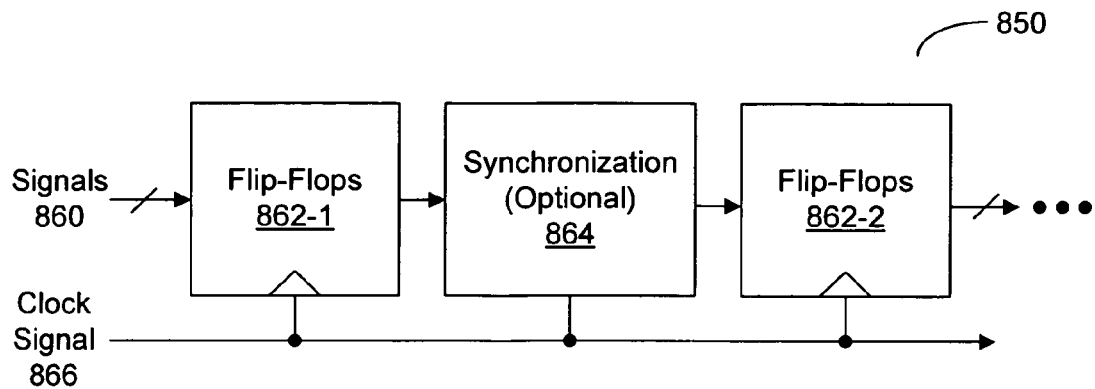
FIG. 8B is a block diagram illustrating an embodiment of a pipeline.

As discussed above, in some embodiments communication across the bridge chips 816 is synchronous. FIG. 8B presents a block diagram illustrating an embodiment of a pipeline 850 for use in these embodiments. Signals 860 on one or more signal lines from one of the semiconductor dies 810 (FIG. 8A) are coupled to a series of registers or flip-flops 862, where they are clocked or latched in accordance with a clock signal 866.

The pipeline 850 may utilize a clock-forwarding architecture, in which the clock signal 866 is provided by one of the semiconductor dies 810. In other embodiments, a clock recovery circuit (not shown) may recover the clock signal 866 from one or more of the signals 860. Note that the flip-flops 862 may be clocked on one or both edges of the clock signal 866.

The pipeline 850 may include an optional synchronization circuit 864, which may bound an accumulated phase difference or error between signals on at least two signal lines to less than one clock period, for example, by adjusting a delay provided by one or more adjustable delay elements on one or more of the signal lines. In other embodiments, the synchronization circuit 864 may be implemented in at least one of the semiconductor dies 810 (FIG. 8A) coupled to the bridge chips 816 (FIG. 8A).

In order to function properly, it may be necessary to achieve phase lock or synchronization between signals on at least two signals lines in an initialization or calibration mode of operation. For example, circuits may be used to reduce a phase error between these signals to less than one clock period before transitioning to a normal mode of operation in which the synchronization circuit 864 helps to maintain the phase error. If the phase error exceeds one clock period, the calibration mode of operation may be used again. Note that the different modes of operation may be applied locally, i.e., to a subset of the signal lines, or globally to all of the signal lines in a given bridge chip or all of the bridge chips 816 (FIG. 8A), as well as to the corresponding transmit and receive circuits in the adjacent semiconductor dies 810 (FIG. 8A).

The pipeline 850 may include fewer components or additional components, such as control logic. Furthermore, two or more components may be combined into a single component, and the position of one or more components may be changed.

Figure 9A:
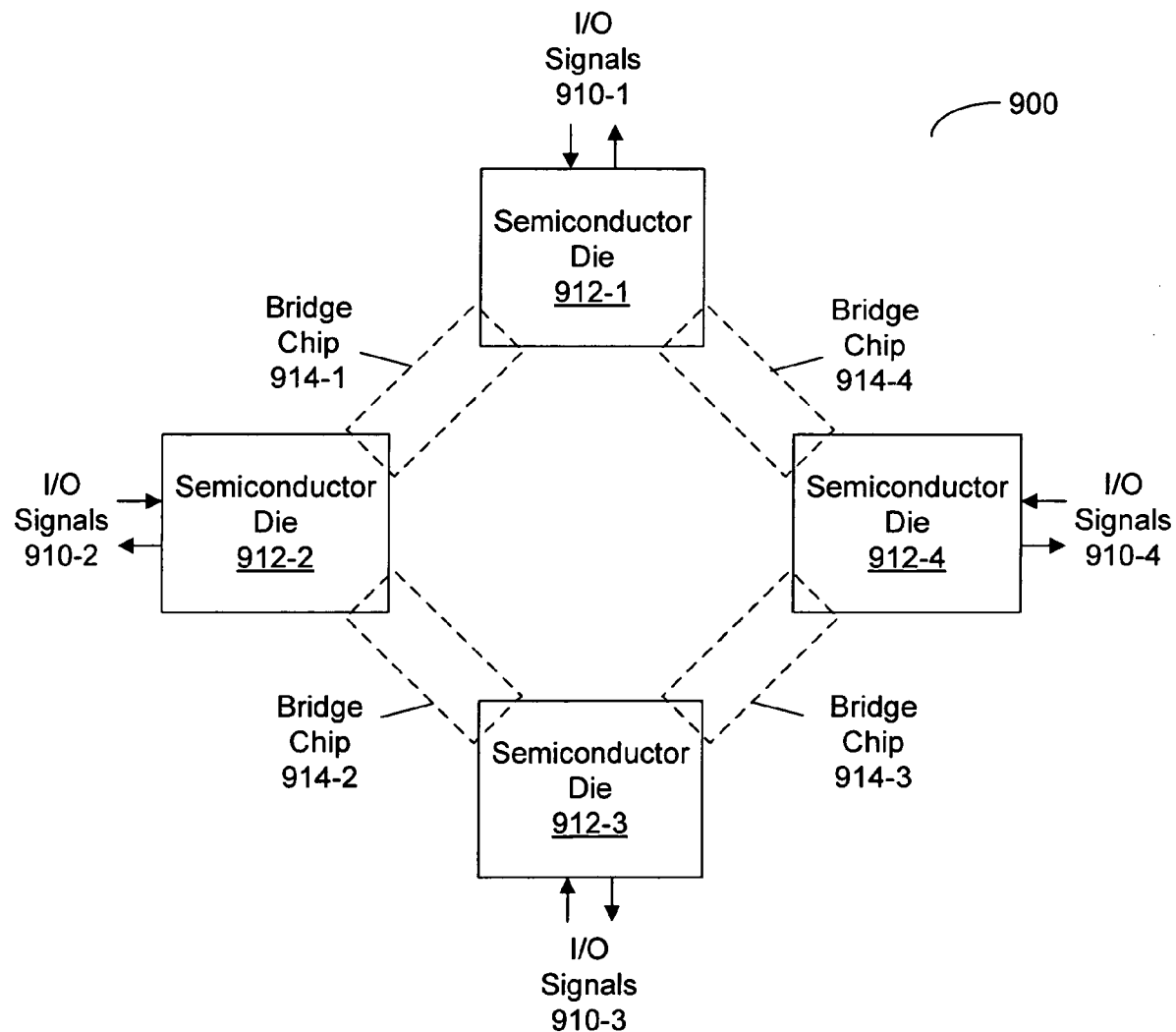
FIG. 9A is a block diagram illustrating an embodiment of a multi-chip switch.
Figure 9B:
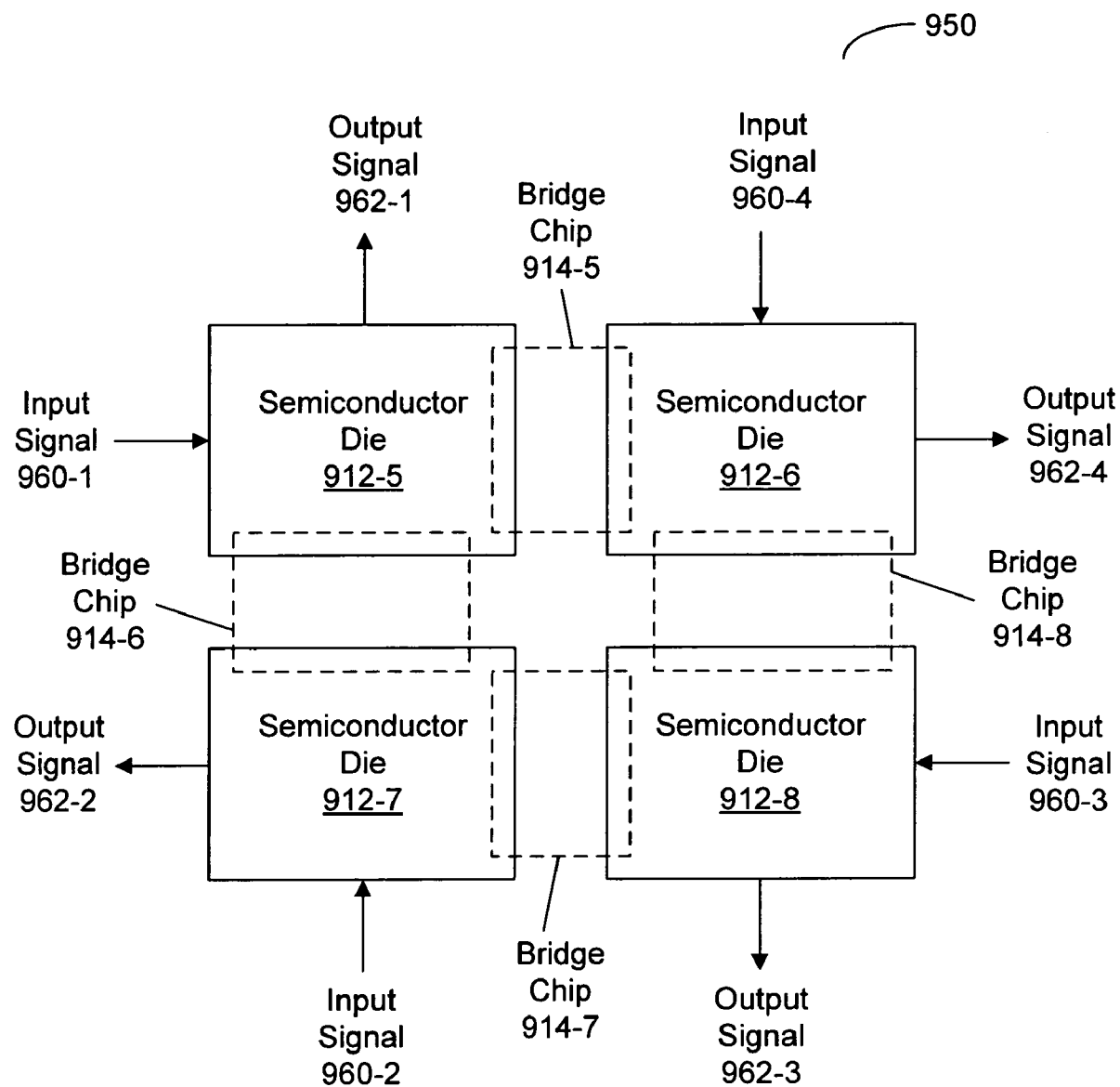
FIG. 9B is a block diagram illustrating an embodiment of a multi-chip switch.

Semiconductor dies may be configured in other vector topographies. FIGS. 9A and 9B present block diagrams illustrating embodiments of multi-chip switches 900 and 950 that have ring topographies. In a ring topology, the average distance and latency between adjacent semiconductor dies 912, i.e., switching blocks or slices, is reduced relative to a linear array, such as the multi-chip switch 700 (FIGS. 7A and 7B).

In multi-chip switch 900, the semiconductor dies 912 receive and output I/O signals 910, and also communicate with adjacent semiconductor dies 912 via bridge chips 914 using proximity connectors located at corners of the semiconductor dies 912. Multi-chip switch 950 is a variation on this configuration in which semiconductor dies 912 receive input signals 960 and transmit output signals 962 along orthogonal directions (as opposed to a direction for a given semiconductor die) and the proximity connectors are located along edges of the semiconductor dies 912. Note that depending on the location in the ring, proximity connectors on at least one corner or edge of a given bridge chip may not be used. As a consequence, in some embodiments one of the bridge chips 914 may be removed.

Figure 10:
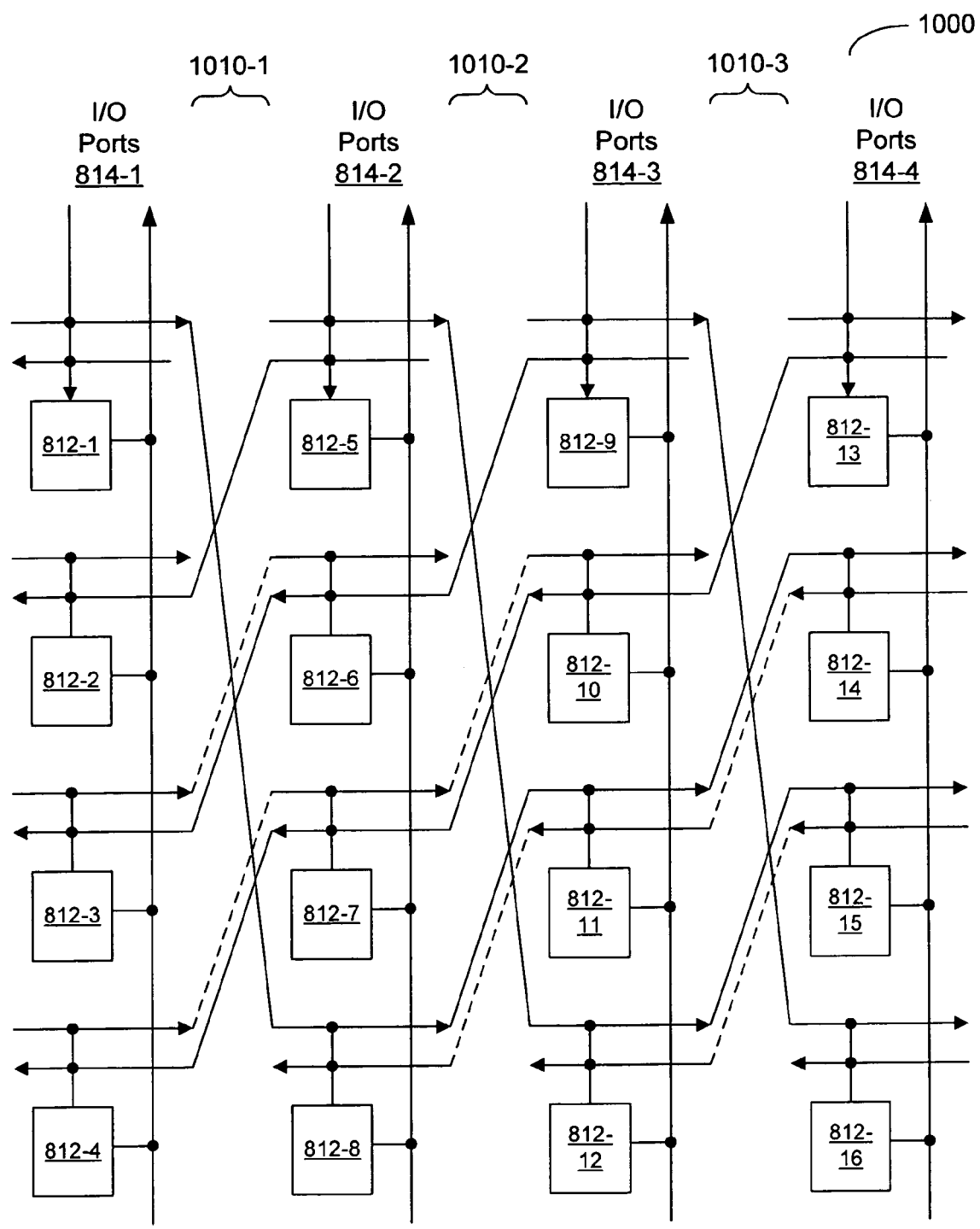
FIG. 10 is a block diagram illustrating an embodiment of a buffered crossbar.

As noted above in the discussion of the multi-chip switch 800 (FIG. 8A), the architecture of the semiconductor dies 810 (FIG. 8A) or switching blocks is not the same. FIG. 10 presents a block diagram illustrating an embodiment of a buffered crossbar 1000 that addresses this issue. (For clarity, the semiconductor die and bridge chip boundaries are not shown in the buffered crossbar 1000.) In particular, each of the switching blocks has a common architecture in which an input signal line from each of the I/O ports 814 is coupled to a first one of the buffer memories 812, and the buffer memories 812 selectively couple row and column signal lines in the array.

Note that the use of unidirectional row signal lines in the buffered crossbar 1000 results in redundancy in interconnects 1010. To address this issue, some of the signal lines are removed from the interconnects 1010 and others (shown as dashed lines) are not used. Furthermore, in some embodiments, the routing of the signal lines in the interconnects 1010 may be implemented in the semiconductor dies or in the bridge chips, and/or the redundancy in the interconnects may be addressed using bidirectional signal lines.

Each of the buffer memories 812 in the semiconductor dies in the buffered crossbar 1000 is associated with a separate clock domain. The corresponding clock signals may be generated locally (in each of the semiconductor dies), externally by a circuit coupled to the I/O ports 814, or separate clock signals may be used on each direction of the row signal lines. If this technique is used, the buffer memories 812 may each include two buffers, one for each row-signal-line direction.

Figure 11:
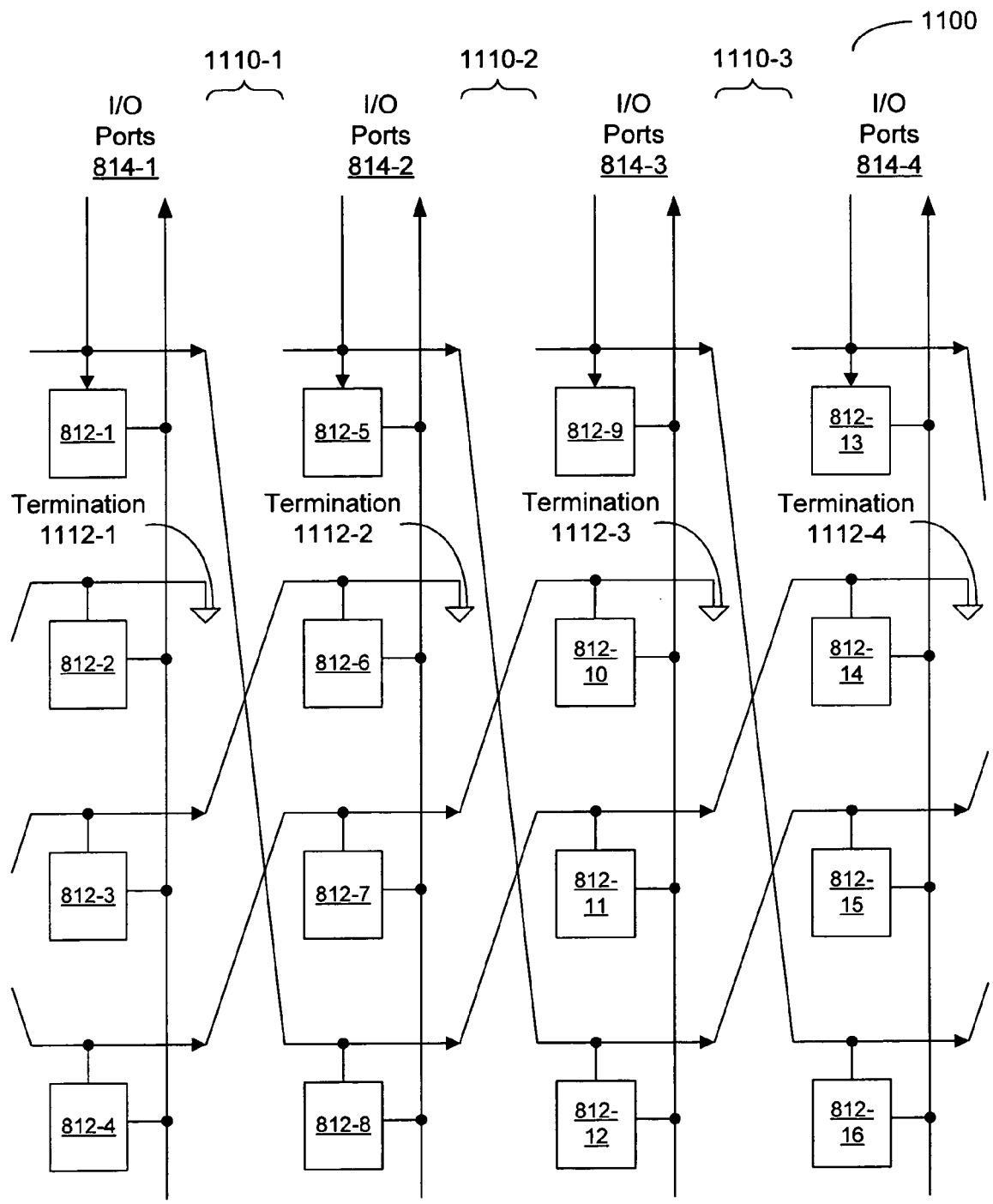
FIG. 11 is a block diagram illustrating an embodiment of a buffered crossbar.

FIG. 11 presents a block diagram illustrating an embodiment of a buffered crossbar 1100 that corresponds to a ring topology, such as that used in the multi-chip switches 900 (FIG. 9A) and 950 (FIG. 9B). For clarity, the semiconductor die and bridge chip boundaries are not shown in the buffered crossbar 1000. Also note that the signal lines in interconnects 1110 have fewer data paths than in the buffered crossbar 1000 (FIG. 10), since data can be communicated using unidirectional signal lines and still wrap around the ring array. After one rotation through the array, the signal lines end at terminations 1112, which implement data sinks. Furthermore, in some embodiments the routing of the signal lines in the interconnects 1110 may be implemented in the semiconductor dies or in the bridge chips, and/or bidirectional signal lines may be used.

The size of the buffer memories 812 in the buffered crossbar 1100, as well as in the multi-chip switch 800 (FIG. 8A) and the buffered crossbar 1000 (FIG. 10), is at least in part a function of the length and the associated delays in the signal lines between the buffer memories 812 and the I/O ports 814. In essence, these delays determine a stability of a data control loop, since the buffer memories 812 send flow control signals to the I/O ports 814 in accordance with a current state of the buffer memories 812 (i.e., whether the buffer memories 812 are full or not). Therefore, larger latency or delay in the signal lines may lead to larger buffer memories 812.

Figure 12:
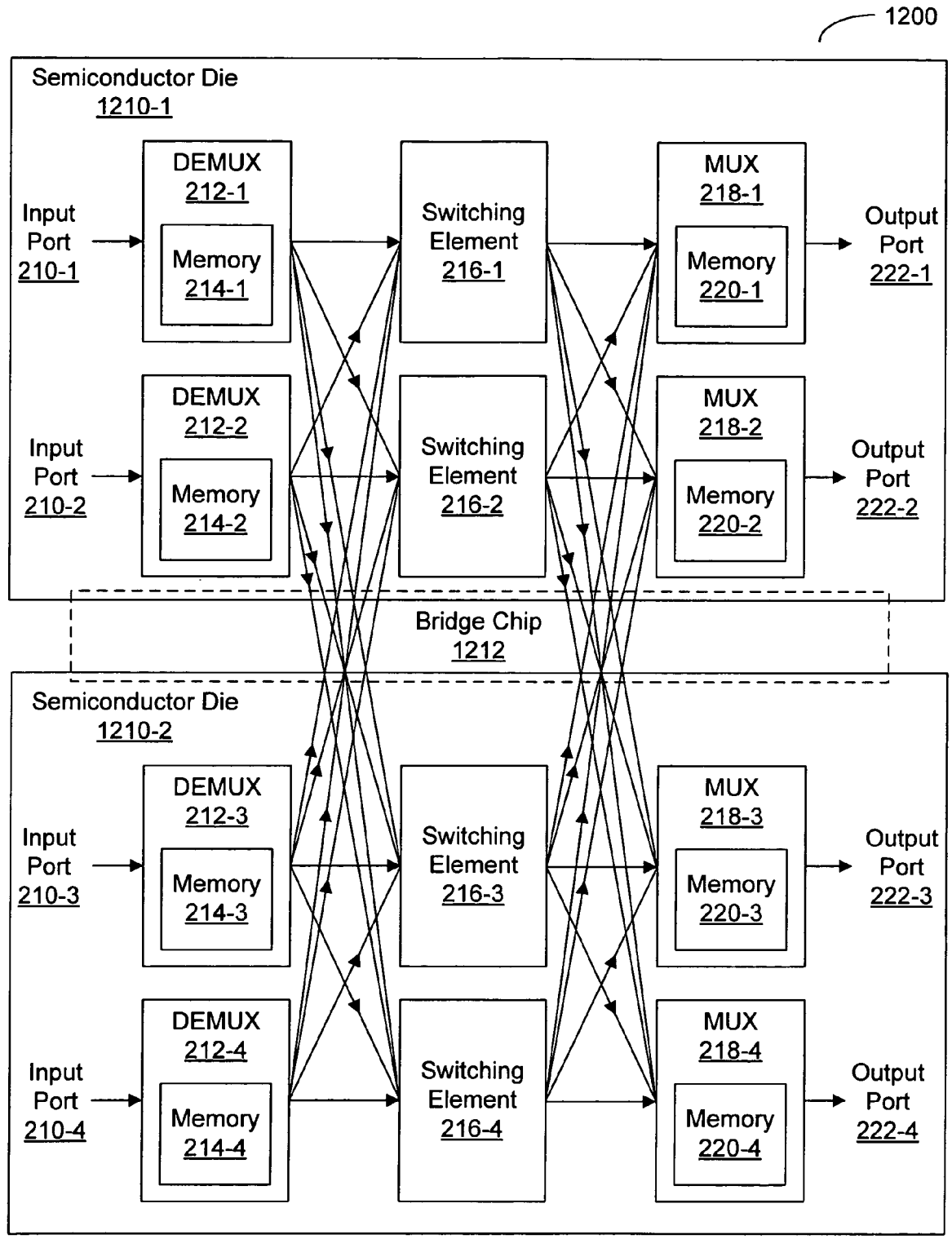
FIG. 12 is a block diagram illustrating an embodiment of a multi-chip switch.
Figure 13:
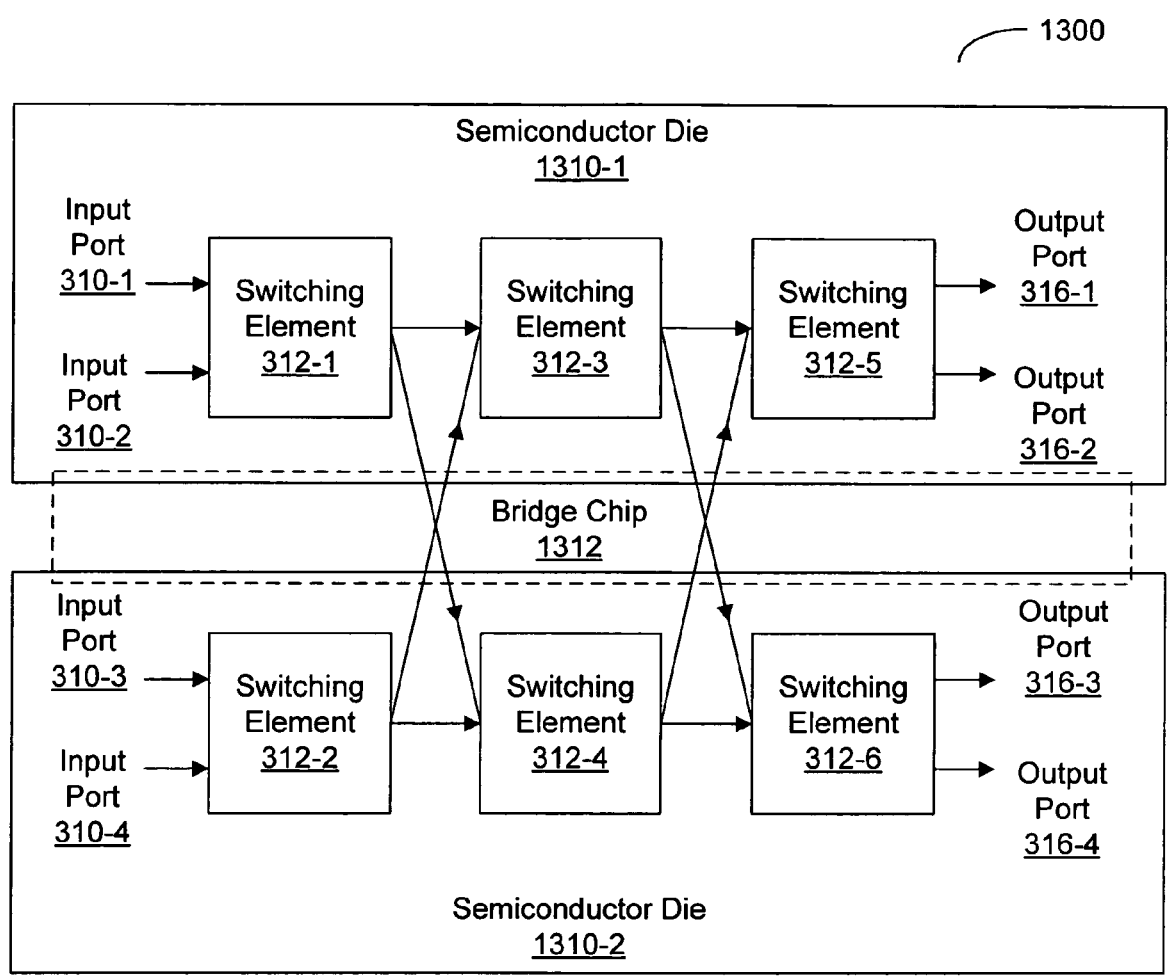
FIG. 13 is a block diagram illustrating an embodiment of a multi-chip switch.
Figure 14:
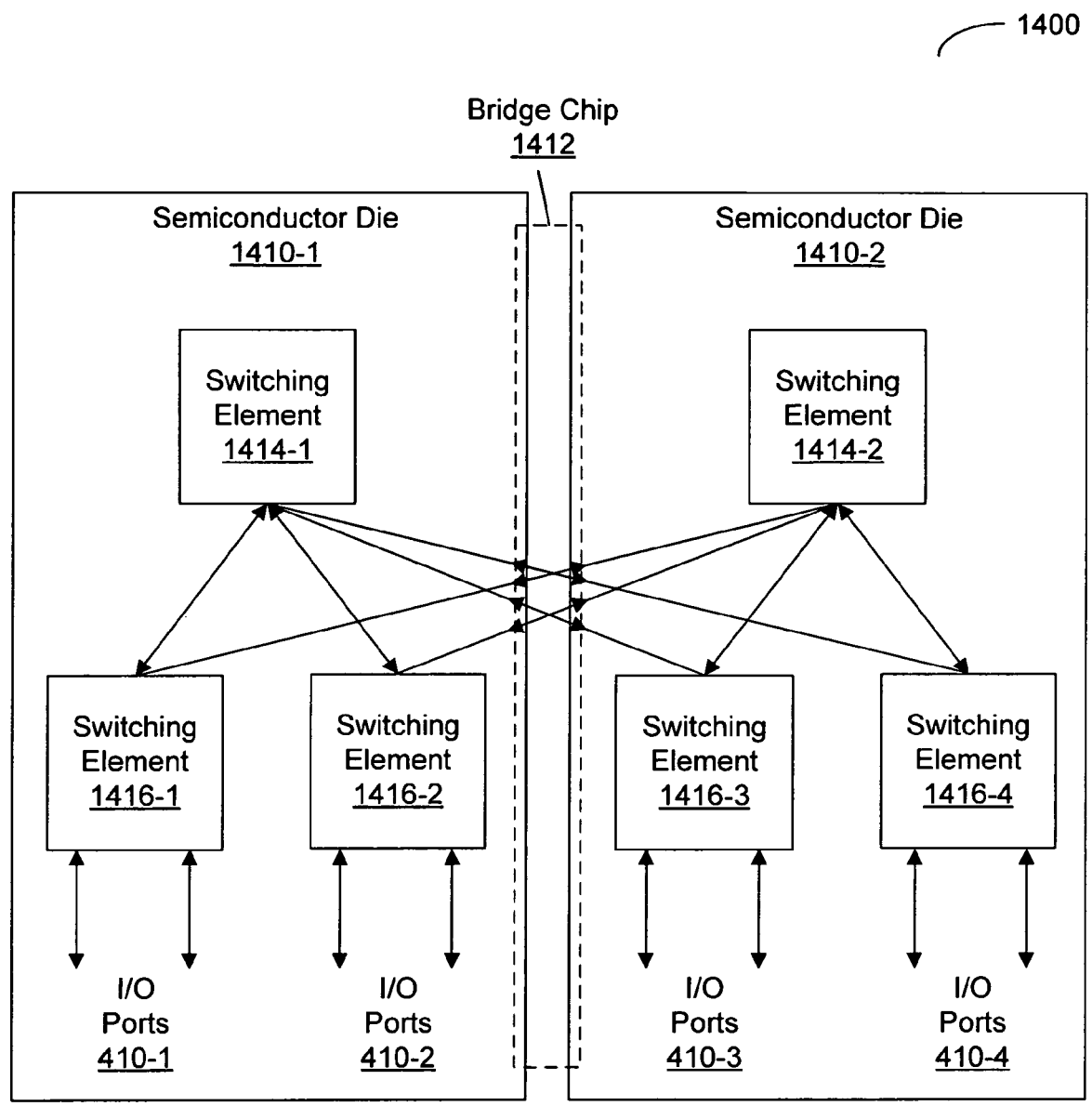
FIG. 14 is a block diagram illustrating an embodiment of a multi-chip switch.

FIGS. 12-14 illustrate additional multi-chip switches. FIG. 12 presents a block diagram illustrating an embodiment of a multi-chip switch 1200 that corresponds to the multi-chip switch 200 (FIG. 2). Bridge chip 1212 couples two semiconductor dies 1210 that have a common architecture to implement a 4 I/O port switch that has four 4×4 switching elements 216. As in the previous embodiments, the semiconductor dies 1210 communicate with each other using proximity communication. Thus, the bisection bandwidth (across the bridge chip 1212) equals the full bandwidth of the multi-chip switch 1200.

FIG. 13 presents a block diagram illustrating an embodiment of a multi-chip switch 1300 that corresponds to an embodiment of the multi-switch 300 (FIG. 3), i.e., it implements a Clos network. Once again, bridge chip 1312 couples two semiconductor dies 1310 that have a common architecture to implement a 4 I/O port switch that has six 2×2 switching elements 312. As in the previous embodiments, the semiconductor dies 1310 communicate with each other using proximity communication. Thus, the bisection bandwidth (across the bridge chip 1312) equals the full bandwidth of the multi-chip switch 1300. Note that for larger switches, the use of the Clos network reduces the number of crosspoints. Thus, the multi-chip switch 1300 includes more crosspoints that the multi-chip switch 800 (FIG. 8A).

Note that the topology of the multi-chip switch 1300 may be divided or sliced differently among the constituent semiconductor dies 1310. For example, instead of a horizontal division a vertical division may be used, resulting in a number of slices that each include a switching stage. However, these slices are not identical. For a switch having N stages, there are 3 types of slices, with an input slice, N−2 middle slices, and an output slice. In addition, the multi-chip switch 1300 may be divided or sliced both horizontally and vertically.

FIG. 14 presents a block diagram illustrating an embodiment of a multi-chip switch 1400 that corresponds to an embodiment of the multi-switch 400 (FIG. 4), i.e., it implements a fat-tree network. Once again, bridge chip 1412 couples two semiconductor dies 1410 that have a common architecture to implement a 8 I/O port switch that has six 2×2 switching elements 1414 and 1416. As in the previous embodiments, the semiconductor dies 1410 communicate with each other using proximity communication. Thus, the bisection bandwidth (across the bridge chip 1412) equals the full bandwidth of the multi-chip switch 1400. Furthermore, as in the multi-chip switch 1300 (FIG. 13), note that the use of the fat-tree network reduces the number of crosspoints, i.e., the complexity of the switching elements 1414 and 1416, relative to vector multi-chip switch topologies, such as the multi-chip switch 800 (FIG. 8A).

Note that the number of switching elements 1414 in the upper row of the multi-chip switch 1400 is determined by the number of inputs per switching element 1416 in the lower row. In architectures that include more switching elements or more rows, the multi-stage switch 1400 may be divided into more slices, and therefore may include additional semiconductor dies 1410.

In each of the preceding multi-chip switches 1200 (FIG. 12), 1300 (FIG. 13) and 1400 (FIG. 14), it should be noted that more I/O ports may be aggregated into a single semiconductor die or switching block. In addition, the size of the switches may be increased by coupling in additional semiconductor dies using additional bridge chips.

Figure 15:
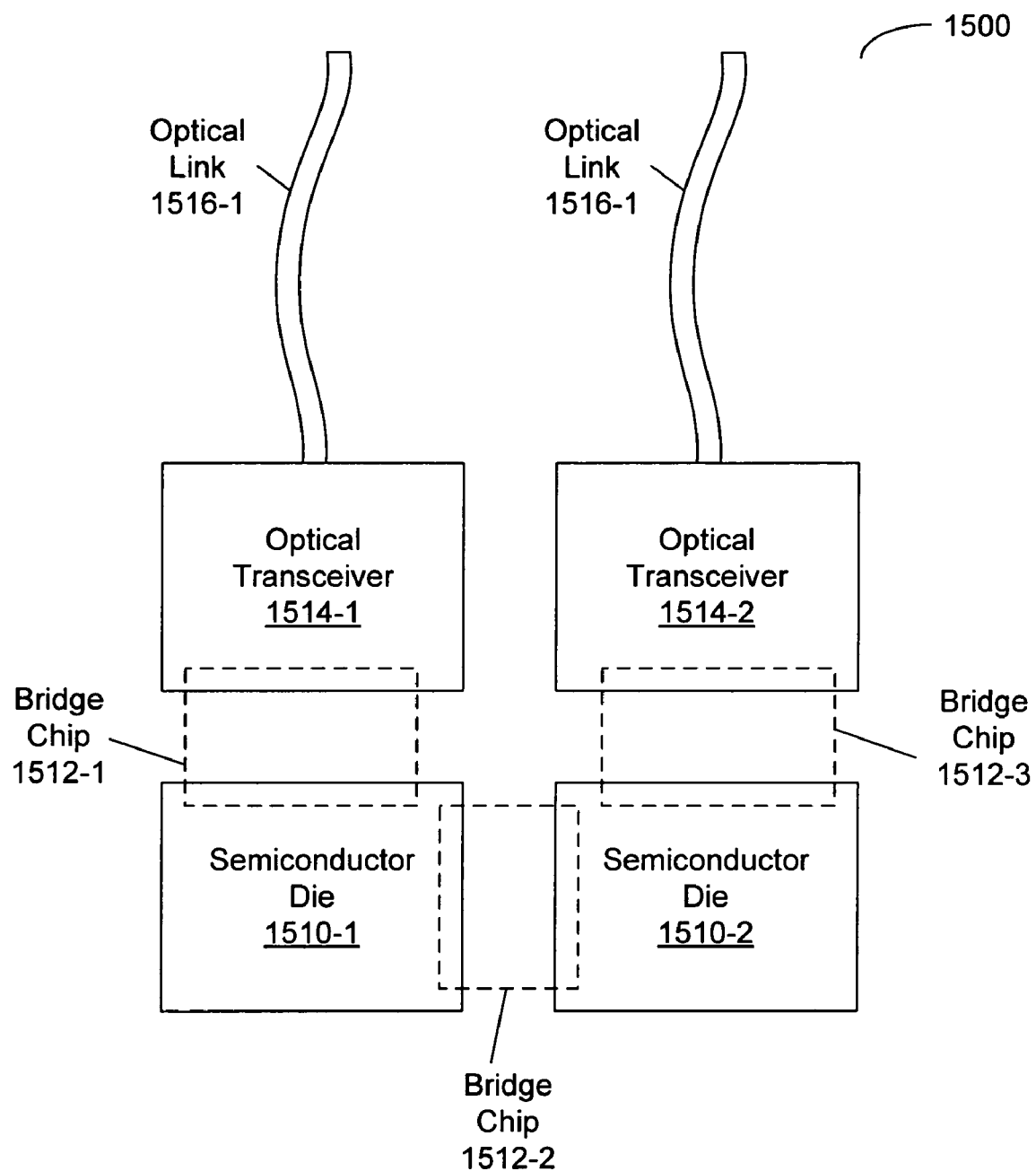
FIG. 15 is a block diagram illustrating an embodiment of a multi-chip switch including optical transceivers.

To match the high bandwidth of a switch that uses proximity communication, a high bandwidth I/O technology may be used. Fiber optic links are one such technology. FIG. 15 presents a block diagram illustrating an embodiment of a multi-chip switch 1500 that includes semiconductor dies 1510 coupled to optical transceivers 1514 using proximity communication and bridge chips 1512. The optical transceivers 1514 are coupled to optical links 1516, such as optical fibers. In some embodiments, these optical links 1516 may use dense wavelength division multiplexing (DWDM). And note that in some embodiments the optical transceivers 1514 and optical links 1516 may be external to the multi-chip switch 1500.

Figure 16:
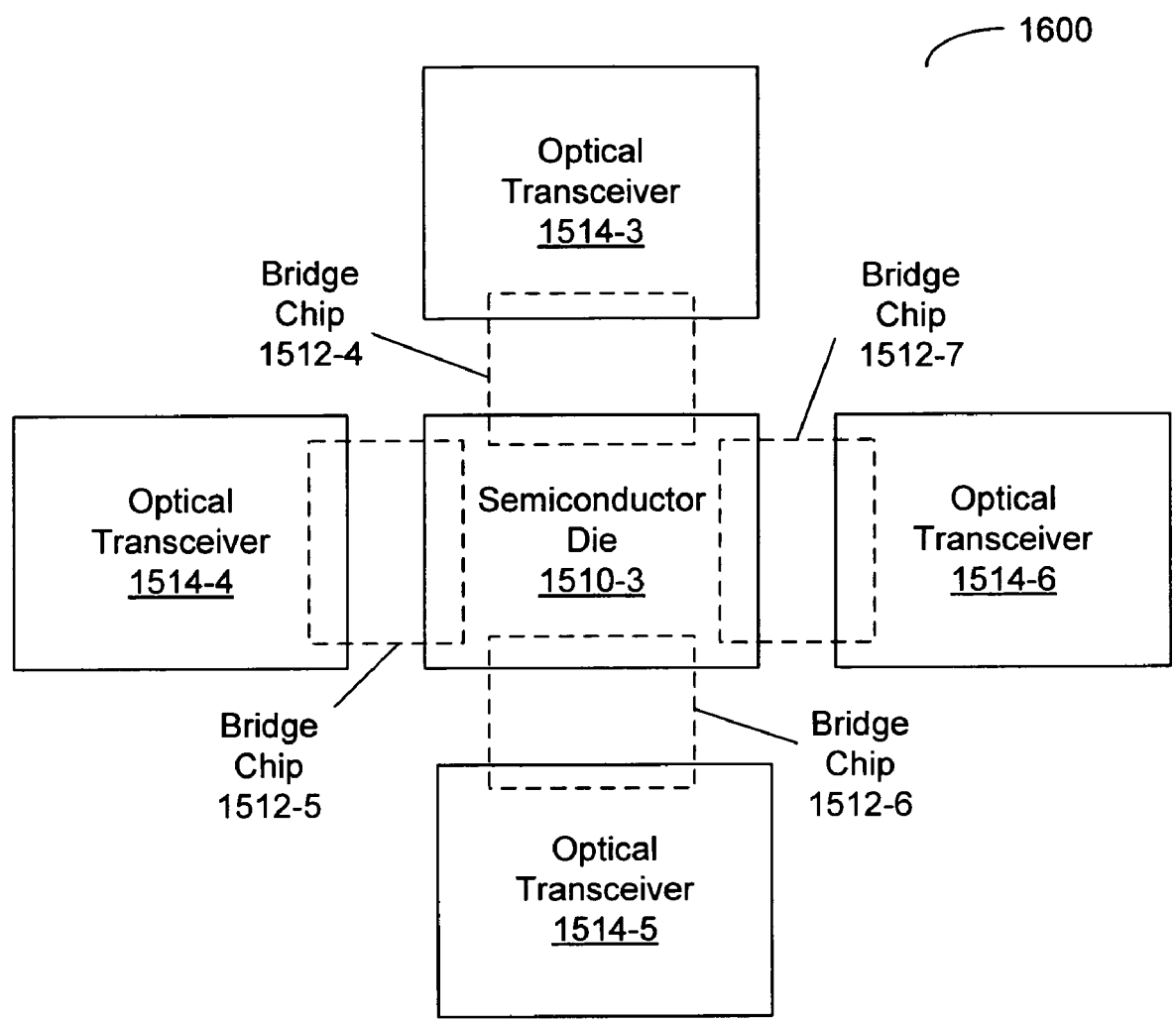
FIG. 16 is a block diagram illustrating an embodiment of a single-chip switch coupled to optical transceivers.

FIG. 16 presents a block diagram illustrating an embodiment of a single-chip switch 1600 that includes a semiconductor die 1510-3 coupled to optical transceivers 1514 using proximity communication and bridge chips 1512. The optical transceivers 1514 are coupled to optical links (not shown).

In an exemplary embodiment, a multi-chip switch includes 16 semiconductor dies or switching blocks arranged in a linear array (such as that illustrated in multi-chip switch 700 in FIG. 7A), to form a 64 Tb/s switch. Each of the semiconductor dies is coupled (via a bridge chip) to an optical transceiver that interfaces to a fiber-optic ribbon cable. These cables each have a capacity of 4 Tb/s and are coupled to line cards that may be more than 100 ft away.

In another exemplary embodiment, a Clos-network 3-stage switch (such as the multi-chip switch 1300 in FIG. 13) has 256 inputs and 256 outputs and uses 16×16 switching elements. With an I/O port bandwidth of 10 Gb/s, the aggregate throughput in this embodiment is 2.5 Tb/s. Note that each of the 16×16 switching elements includes 256 crosspoints.

If this switch implements a buffered crosspoint switch then each crosspoint buffer should be capable of holding at least two Ethernet data packets with a maximum size of 1,500 bytes (B). In this case, each 16×16 switching element may have 768 kB (256×3 kB) of memory, such as SRAM. If the switch is sliced into 3 semiconductor dies that each include one 16×16 switching element, a total of 2.25 MB (3×768 kB) of on-chip memory may be used.

Note that a 6-transistor SRAM bit measures about 1 $\mu m^2$ using 90 nm ASIC technology. If an overhead of 100% is assumed for address decoding, I/O drivers, etc., 2.25 MB or 18 Mbit of SRAM memory may occupy an area of approximately 36 mm$^2$ (2×18×10$^6$ $\mu m^2$). This is about a third of the surface area of a 10 mm×10 mm chip die.

In some embodiments, the high I/O bandwidth offered by proximity communication may be used to simplify the architecture and/or the design of a multi-chip switching fabric. For example, proximity communication may allow a monolithic design to be used. Since there is little difference between on-chip and off-chip communication with this technology, it may not be necessary to structure the implementation hierarchically to overcome limitations that are often encountered in off-chip communication with other technologies. This is illustrated in FIG. 13 in which the properties of the links that couple switching elements on the same semiconductor die are very similar to the links or interconnects that couple switching elements on different semiconductor dies. In particular, the links have similar bandwidth and/or flow control schemes.

At the architectural level, proximity communication may allow architectural simplicity to be traded off against speed-up in the switching fabric. For example, a load-balanced switch architecture may become an attractive option, since this architecture does not require a switch scheduler and, therefore, scales well to a large number of I/O ports. In this architecture, two switching elements are used in sequence (with the first one acting as a load balancer), thus doubling the switching bandwidth.

We now discuss methods for switching signals. FIG. 17 presents a flow chart illustrating an embodiment of a process 1700 for switching signals. During this process, signals are selectively coupled from one or more input ports to one or more output ports of a switch (1710). While coupling the signals, the signals may be communicated between semiconductor dies in the switch using proximity connectors that are capacitively coupled (1712). In some embodiments, there may be additional or fewer operations, the order of the operations may be changed, and two or more operations may be combined into a single operation.

Figure 18:
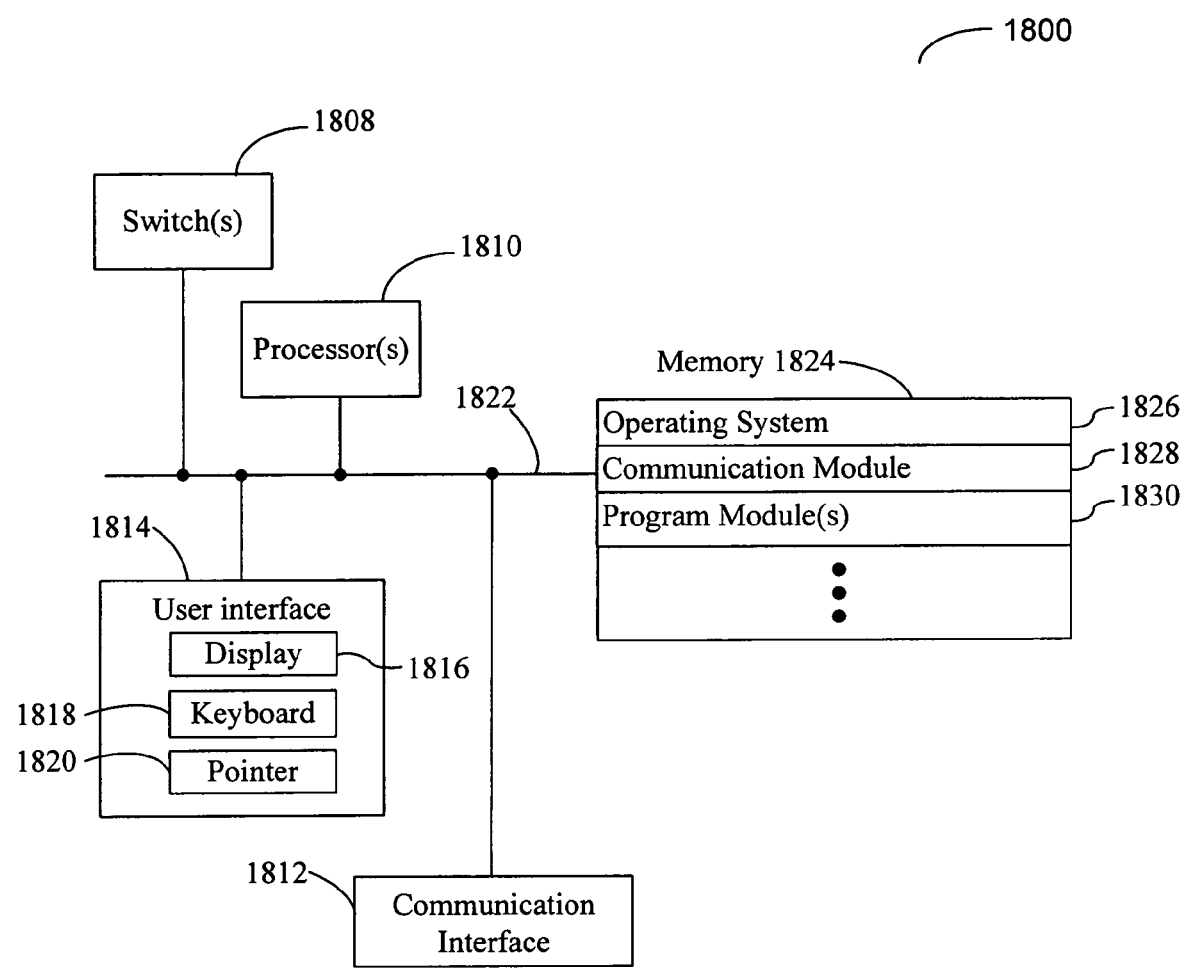
FIG. 18 is a block diagram illustrating an embodiment of a computer system.

The present invention may include systems that contain one or more switches, which include components (such as one or more semiconductor dies) that communicate signals using capacitively coupled proximity connectors. For example, FIG. 18 presents a block diagram illustrating an embodiment of a computer system 1800, which includes one or more processors 1810, a communication interface 1812, a user interface 1814, and one or more signal lines 1822 coupling these components together. Note that the one or more processing units 1810 may support parallel processing and/or multi-threaded operation, the communication interface 1812 may have a persistent communication connection, and the one or more signal lines 1822 may constitute a communication bus. Moreover, the user interface 1814 may include a display 1816, a keyboard 1818, and/or a pointer, such as a mouse 1820.

The computer system 1800 may include memory 1824, which may include high speed random access memory and/or non-volatile memory. More specifically, memory 1824 may include ROM, RAM, EPROM, EEPROM, FLASH, one or more smart cards, one or more magnetic disc storage devices, and/or one or more optical storage devices. Memory 1824 may store an operating system 1826, such as SOLARIS, LINUX, UNIX, OS X, or WINDOWS, that includes procedures (or a set of instructions) for handling various basic system services for performing hardware dependent tasks. The memory 1824 may also store procedures (or a set of instructions) in a communication module 1828. The communication procedures may be used for communicating with one or more computers and/or servers, including computers and/or servers that are remotely located with respect to the computer system 1800.

Memory 1824 may also include the one or more program modules (of sets of instructions) 1830. Instructions in the program modules 1830 in the memory 1824 may be implemented in a high-level procedural language, an object-oriented programming language, and/or in an assembly or machine language. The programming language may be compiled or interpreted, i.e, configurable or configured to be executed by the one or more processing units 1810.

The computer system 1800 may include one or more switches 1808 that include proximity communication as described in the previous embodiments. While not shown in the computer system 1800, in some embodiments the one or more switches 1808 may be coupled to one or more network interface circuits (such as one or more optical transceivers).

The computer system 1800 may include fewer components or additional components, two or more components may be combined into a single component, and/or a position of one or more components may be changed. In some embodiments, the functionality of the computer system 1800 may be implemented more in hardware and less in software, or less in hardware and more in software, as is known in the art.

Although the computer system 1800 is illustrated as having a number of discrete items, FIG. 18 is intended to be a functional description of the various features that may be present in the computer system 1800 rather than as a structural schematic of the embodiments described herein. In practice, and as recognized by those of ordinary skill in the art, the functions of the computer system 1800 may be distributed over a large number of servers or computers, with various groups of the servers or computers performing particular subsets of the functions. In some embodiments, some or all of the functionality of the computer system 1800 may be implemented in one or more application specific integrated circuits (ASICs) and/or one or more digital signal processors (DSPs).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A multi-chip switch, comprising:
a first semiconductor die;
a second semiconductor die;
wherein each of the first semiconductor die and the second semiconductor die comprises:
a plurality of proximity connectors proximate to a surface of the semiconductor die, wherein the semiconductor die is communicates signals by capacitive coupling using one or more of the plurality of proximity connectors;
wherein the plurality of proximity connectors comprise a plurality of input ports to receive the signals, and a plurality of output ports to output the signals; and a plurality of switching elements to selectively couple the plurality of input ports to the plurality of output ports in accordance with a set of control signals, wherein the set of control signals corresponds to a configuration of the switch;
a bridge chip capacitively coupled to the plurality of proximity connectors on the first semiconductor die and the plurality of proximity connectors on the second semiconductor die to provide communication paths which enable the first semiconductor die and the second semiconductor die collectively function as part of the multi-chip switch;
wherein the bisection bandwidth across the bridge chip equals the full bandwidth of the multi-chip switch.

2. The multi-chip switch of claim 1, further comprising control logic coupled to the plurality of switching elements, wherein the control logic provides the set of control signals.

3. The multi-chip switch of claim 1, wherein communication of at least a subset of the signals over the bridge chip is synchronous.

4. The multi-chip switch of claim 1, wherein communication of at least a subset of the signals over the bridge chip is asynchronous.

5. The multi-chip switch of claim 1, wherein the bridge chip includes a plurality of signal lines, and wherein the switch further comprises a circuit to resynchronize phases of respective signals on at least two signal lines in the plurality of signal lines.

6. The multi-chip switch of claim 1, wherein the first semiconductor die and the second semiconductor die have a common architecture.

7. The multi-chip switch of claim 1, wherein the first semiconductor die, the second semiconductor die and zero or more additional semiconductor dies are arranged in a linear array.

8. The multi-chip switch of claim 1, wherein the first semiconductor die, the second semiconductor die and zero or more additional semiconductor dies are arranged in a ring topology.

9. The multi-chip switch of claim 1, wherein the first semiconductor die, the second semiconductor die and zero or more additional semiconductor dies are arranged in a 2-dimensional array.

10. The multi-chip switch of claim 1, wherein the multi-chip switch includes a fat-tree network.

11. The multi-chip switch of claim 1, wherein the multi-chip switch includes a Clos network.

12. The multi-chip switch of claim 1, further comprising an optical transceiver coupled to the first semiconductor die.

13. The multi-chip switch of claim 1, wherein the first semiconductor die further comprises a memory.

14. The multi-chip switch of claim 1, further comprising a demultiplexer coupled between the plurality of input ports and the plurality of switching elements, wherein the demultiplexer provides data units to the plurality of switching elements in accordance with the configuration of the multi-chip switch.

15. The multi-chip switch of claim 14, wherein a given data unit has a fixed size.

16. The multi-chip switch of claim 14, wherein a given data unit has a variable size.

17. The switch of claim 14, further comprising a multiplexer coupled between the plurality of switching elements and the plurality of output ports, wherein the multiplexer receives data units from the plurality of switching elements.

18. The multi-chip switch of claim 17, wherein the data units are received at the multiplexer in a different order than that provided by the demultiplexer.

19. The multi-chip switch of claim 1, wherein the signals are encoded with a channel code that is DC-balanced.

20. A computer system, comprising:
a processor;
a memory; and
a multi-chip switch comprising:
 a first semiconductor;
 a second semiconductor die;
 wherein each of the first semiconductor die and the second semiconductor die comprises:
  a plurality of proximity connectors proximate to a surface of the semiconductor die, wherein the semiconductor die is communicates signals by capacitive coupling using one or more of the plurality of proximity connectors;
  wherein the plurality of proximity connectors comprise a plurality of input ports to receive the signals, and a plurality of output ports to output the signals; and
  a plurality of switching elements to selectively couple the plurality of input ports to the plurality of output ports in accordance with a set of control signals, wherein the set of control signals corresponds to a configuration of the switch;
 a bridge chip capacitively coupled to the plurality of proximity connectors on the first semiconductor die and the plurality of proximity connectors on the second semiconductor die to provide communication paths which enable the first semiconductor die and the second semiconductor die collectively function as part of the multi-chip switch;
 wherein the bisection bandwidth across the bridge chip equals the full bandwidth of the multi-chip switch.

21. A method for switching signals, comprising:
selectively coupling the signals from one or more input ports to one or more output ports of a multi-chip switch in accordance with a switching configuration of the multi-chip switch;
while coupling the signals, communicating the signals between semiconductor dies in the multi-chip switch using proximity connectors that are capacitively coupled; and
wherein communicating the signals between the semiconductor dies involves communicating signals through a bridge chip which is capacitively coupled between semiconductor dies in the multi-chip switch to provide communication paths that enable the semiconductor dies to collectively function as part of the multi-chip switch;
wherein the bisection bandwidth across the bridge chip equals the full bandwidth of the multi-chip switch.

* * * * *

UNITED STATES PATENT AND TRADEMARK OFFICE
CERTIFICATE OF CORRECTION

PATENT NO. : 7,490,189 B2  
APPLICATION NO. : 11/454166  
DATED : February 10, 2009  
INVENTOR(S) : Hans Eberle et al.

Page 1 of 1

It is certified that error appears in the above-identified patent and that said Letters Patent is hereby corrected as shown below:

In claim 20 (at column 17, line 30), please insert the word --die-- after the word semiconductor so that the line reads: "a first semiconductor die;".

Signed and Sealed this

Thirty-first Day of March, 2009

JOHN DOLL  
*Acting Director of the United States Patent and Trademark Office*